United States Patent [19]
Oltman et al.

[11] Patent Number: 5,582,930
[45] Date of Patent: Dec. 10, 1996

[54] HIGH ENERGY DENSITY METAL-AIR CELL

[75] Inventors: John E. Oltman, Mount Horeb; Robert B. Dopp, Madison, both of Wis.; John D. Burns, Durham, United Kingdom

[73] Assignee: Rayovac Corporation, Madison, Wis.

[21] Appl. No.: 435,485

[22] Filed: May 5, 1995

[51] Int. Cl.⁶ ............................................. H01M 12/06
[52] U.S. Cl. ........................ 429/27; 429/162; 429/172
[58] Field of Search ........................... 429/94, 164, 166, 429/171, 172, 66, 27, 162, 173

[56] References Cited

U.S. PATENT DOCUMENTS

| | | | |
|---|---|---|---|
| Re. 31,413 | 10/1983 | Jaggard | 429/27 |
| 3,372,060 | 3/1968 | Platner | 136/86 |
| 3,746,580 | 7/1973 | Aker et al. | 136/86 |
| 4,020,242 | 4/1977 | Okazaki et al. | 429/164 X |
| 4,054,726 | 10/1977 | Sauer et al. | 429/66 |
| 4,137,375 | 1/1979 | Coueille | 429/66 |
| 4,209,574 | 6/1980 | Reutschi | 429/133 |
| 4,254,593 | 3/1981 | Paulfeuerborn | 51/425 |
| 4,262,062 | 4/1981 | Zatsky | 429/27 |
| 4,343,869 | 8/1982 | Oltman et al. | 429/27 |
| 4,369,568 | 1/1983 | Dopp | 29/623.2 |
| 4,591,539 | 5/1986 | Oltman et al. | 429/27 |
| 4,649,090 | 3/1987 | Oltman et al. | 429/29 |
| 4,687,714 | 8/1987 | Oltman et al. | 429/27 |
| 4,791,034 | 12/1988 | Dopp | 429/27 |
| 4,822,698 | 4/1989 | Jackoritz | 429/27 |
| 5,069,986 | 12/1991 | Dworkin | 429/27 |
| 5,308,711 | 5/1994 | Passaniti et al. | 429/29 |

*Primary Examiner*—Donald R. Valentine
*Attorney, Agent, or Firm*—Tom Wilhelm; Brian Tumm

[57] ABSTRACT

This invention pertains to alkaline electrochemical cells, typically to metal-air cells of the button-type. Non-reactive elements of cells of the invention are thinner than corresponding non-reactive elements of prior art cells. Such elements can be made thinner because of improved structures of such elements. The anode can be made from a metal strip structure having a higher steel content. The cathode can has a modified temper, which improves relative stiffness and rigidity while retaining sufficient ductility. The seal disposed between the anode can and the cathode can is made thinner. Structure of the corner of the cathode can between the bottom and the side wall is improved. By so reducing the thicknesses of non-reactive elements of the cell, and thus the volume occupied by such non-reactive elements, the fraction of the cell devoted to holding electrochemically reactive anode material therein is increased, with corresponding increase in the milliampere hour capacity of the cell.

103 Claims, 12 Drawing Sheets

HIGH ENERGY DENSITY METAL-AIR CELL

FIELD OF THE INVENTION

This invention relates to alkaline electrochemical cells, typically to such cells which have metal-containing anode materials and air cathodes, commonly known as metal-air cells. More particularly, this invention relates to the structure of the several components from which the cell is assembled, and to the overall structure of the cell itself, addressing the efficient use of the three-dimensional volume to be occupied by such cells in electrical appliances. The invention addresses efficient use of non-reactive e.g. structural materials in preserving as much space as possible for use by the electrochemically reactive anode material used by the cell for generating electrical energy, providing an increase in the fraction of the overall volume of the cell which can be allocated to/occupied by the electrochemically reactive anode material.

BACKGROUND OF THE INVENTION

The growth in use of small electrically-powered devices has increased the demand for very small metal-air electrochemical cells. Metal-air cells have gained significant popularity because only the anode reaction material need be packaged in the cell, while the cathode reaction material is oxygen, which is drawn from the surrounding environment.

Such small cells are usually disc-like or pellet-like in appearance, and are about the size of garment buttons. These cells generally have diameters ranging from less than 6.4 millimeters to about 25 millimeters, and height ranging from less than 2.1 millimeters up to about 15 millimeters. The small size and the limited amount of electrochemically reactive material which can be contained in such small metal-air cells result in considerable attention being directed to improving the efficiency and completeness of the electrochemical reactions, which are used in such cells for generating electrical energy.

Metal-air cells take in atmospheric oxygen, and convert the oxygen to hydroxyl ions in the air cathode. The hydroxyl ions then migrate to the anode, where they cause the metal contained in the anode to oxidize. Usually the active anode material in such cells comprises zinc.

More particularly, the desired reaction in a metal-air cell air cathode involves the reduction of oxygen, the consumption of electrons, and the production of hydroxyl ions, the hydroxyl ions being able to migrate through the electrolyte toward the anode, where oxidation may occur, forming zinc oxide.

In most metal-air cells, air enters the cell through a port in the bottom of the cathode can. The port extends through the bottom cathode can, and may be immediately adjacent the cathode assembly, or may be separated from the cathode assembly by an air reservoir or an air diffusion member.

In any of such arrangements, the port facilitates the movement of air through the bottom of the cathode can and to the cathode assembly. At the cathode assembly, the oxygen in the air reacts with water as a chemically reactive participant in the electrochemical reaction of the cell, and thereby forms the hydroxyl ions.

Since the overall electrochemical capacity of any electrochemical cell is to some extent determined by the quantity of electrochemically reactive materials which can be loaded into the cell, it is important to maximize the size of the cavity, in the cell, which is devoted to containing the reactive materials. In the case of a metal-air cell, contained reactive material is limited to the anode material. The improvements recited herein could, however, be applied to a variety of other electrochemical cells, and need not be, indeed are not, limited to metal-air cells.

In general, the size of any given cell is limited by the inside dimensions of the space provided in the article, or appliance, in which the cell will operate. For example, the size of a hearing aid cell is limited to the internal dimensions of the space, provided for the cell, in the hearing aid appliance. The internal dimensions of the space are determined by the hearing aid manufacturer, not the power cell manufacturer.

Thus, any given appliance includes a limited amount of gross space/volume allotted to occupancy by the electrochemical cell which powers the appliance. That gross space may ultimately be divided according to four competing functions. A first and minimal portion of the space is used to provide clearance between the interior elements of the space and the exterior elements of the electrochemical cell.

A second portion of the space is occupied by the structural and otherwise non-reactive elements of the electrochemical cell.

The third portion of the space is occupied by the electrochemically reactive materials of the electrochemical cell, and especially the anode material.

Finally, a fourth portion of the space, if used, can sometimes be described as "wasted" space, because it serves none of the above first through third portions. Such "wasted" space is typically found outside the cell, e.g. at corner locations, where the corner of the cell is less "square" than is structurally feasible, thereby wasting volume that potentially might be occupied, either directly or indirectly, by electrochemically reactive material. Such "wasted" space might also be considered to be included in the space allocated to "clearance" because such space is typically located outside the cell.

Any increase in the third portion of the space, namely the cavity in the anode can which cavity is allocated to the anode material, is necessarily gained at the expense of one or more of the other three portions of the fixed volume allocated for occupation by the cell, namely the first clearance portion, the second portion devoted to the non-reactive elements of the cell, or any fourth waste portion. Thus, it is important to identify the first, second, and fourth portions of the overall space, and to reduce the absolute amount of the space devoted to such uses. To the extent such uses can be reduced, the space so recovered can, in general, be allocated for use to hold additional amounts of electrochemically reactive anode material, thereby increasing the potential overall capacity of the cell to generate electrical energy.

Of the first, second, and fourth portions of the cell, the first portion, devoted to clearance, appears to hold the least potential for providing much if any significant opportunities for reduction in volume, and the total volume of the "clearance" space is typically relatively small. Namely, overall cell height and width dimensions are specified by the International Electrochemical Commission (IEC). While some manufacturers may employ designs which utilize readily definable wasted space on the outside of the cell, especially at lower corners of the cell, other manufacturers appear to more fully utilize the allocated space.

Accordingly, while some small amount of volume may be recovered from "wasted" space, or by reducing the "clearance" space, applicants have concluded that the greatest potential for recovering space for use in holding anode material, and thus to increase "volume efficiency" of the cell, lies in the second portion of the cell, namely the structural and otherwise non-reactive elements of the cell. These elements generally comprise the cathode can, the anode can, the seal, and the cathode assembly, these typically being all of the major structural elements of the cell except for the reactive anode material. Thus, to get more space for holding the reactive anode material, that space must generally be taken away from the anode can, the cathode can, the cathode assembly, or the seal, or some combination of these.

It is an object of this invention to provide electrochemical cells having increased fractions of the cell-receiving space devoted to containing electrochemically reactive anode material.

It is another object to provide metal-air electrochemical cells wherein the thicknesses of one or more of the anode can, the cathode can, the cathode assembly, or the seal have been reduced to thicknesses never before achievable for an electrochemical cell.

It is still another object of the invention to provide such cells wherein the structural integrity of the cell, to abuse from forces outside the cell, is maintained.

Yet another object is to provide improved anode cans, especially with reduced thicknesses.

Still another object is to provide improved cathode cans, especially with reduced thicknesses.

SUMMARY OF THE DISCLOSURE

Some of the objects are obtained in an electrochemical cell, comprising an anode, including an anode can and a cavity in the anode can, and anode material in the cavity, including electrochemically reactive anode material; a cathode, including a cathode can, and a cathode assembly in the cathode can; and a seal between the anode can and the cathode can, the anode and the cathode being joined together, with the seal therebetween and, in combination, defining a top and a bottom of the cell and a height therebetween, and side walls defining a maximum diameter of the electrochemical cell, the height and the maximum diameter, in combination, defining an overall volume of the electrochemical cell, the cavity in the anode can comprising a fraction of the overall volume, the fraction being at least as great as the value represented by the expression $0.65 + [\text{Log}_{10}(\text{Overall Volume})]*0.20$, preferably at least as great as the value represented by the expression $0.69 + [\text{Log}_{10}(\text{Overall Volume})]*0.22$.

In preferred embodiments, the fraction is represented by a range, the lower end of the range being represented by the expression $0.65 + [\text{Log}_{10}(\text{Overall Volume})]*0.20$, and the approximate upper end of the range being represented by the expression $0.77 + [\text{Log}_{10}(\text{Overall Volume})]*0.20$.

In a more preferred range, the value is represented by the expression $0.65 + [\text{Log}_{10}(\text{Overall Volume})]*0.20$, up to the value represented by the expression $0.80 + [\text{Log}_{10}(\text{Overall Volume})]*0.281$, more preferably the value being represented by the expression $0.65 + [\text{Log}_{10}(\text{Overall Volume})]*0.20$, up to the value represented by the expression $0.77 + [\text{Log}_{10}(\text{Overall Volume})]*0.28$, and still more preferably the value being represented by the expression $0.69 + [\text{Log}_{10}(\text{Overall Volume})]*0.22$, up to the value represented by the expression $0.77 + [\text{Log}_{10}(\text{Overall Volume})]*0.20$.

The value of the fraction is well represented by the expression $0.69 + [\text{Log}_{10}(\text{Overall Volume})]*0.22$.

In such embodiments, the anode can preferably has a first wall thickness between about 0.114 millimeter and about 0.145 millimeter, the cathode can has a second wall thickness between about 0.114 millimeter and about 0.155 millimeter, and the seal has a thickness, between the anode can and the cathode can, of about 0.100 millimeter to about 0.150 millimeter.

Preferably, the anode can comprises a structure having a first outer layer corresponding with the outer surface of the electrochemical cell, a second inner layer disposed toward the cavity, and a third layer between the first and second layers, the third layer comprising about 77 percent by weight to about 91 percent by weight, preferably about 80 percent by weight to about 91 percent by weight, more preferably about 83 percent by weight to about 91 percent by weight, still more preferably about 87 percent by weight to about 91 percent by weight, most preferably about 91 percent by weight, of the anode can and comprising stainless steel, the first and second layers, in combination, comprising about 9 percent by weight to about 23 percent by weight, preferably about 9 percent by weight to about 20 percent by weight, more preferably about 9 percent by weight to about 17 percent by weight, still more preferably about 9 percent by weight to about 13 percent by weight, most preferably about 9 percent by weight, of the anode can, the first layer comprising nickel, and the second layer comprising copper.

Most preferably, the first layer comprises about 2 percent by weight to about 3 percent by weight, the second layer comprises about 7 percent by weight to about 16 percent by weight, and the third layer comprises about 81 percent to about 91 percent by weight, of the anode can.

Related to the first family of embodiments, the invention comprehends an electrochemical cell, comprising an anode, including an anode can and a cavity in the anode can, and anode material in the cavity, including electrochemically reactive material; a cathode, including a cathode can, and a cathode assembly in the cathode can; and a seal between the anode can and the cathode can, the anode and the cathode being joined together, with the seal therebetween and, in combination, defining a top and a bottom of the cell, and a height therebetween and side walls defining a maximum diameter of the electrochemical cell, the height and the maximum diameter, in combination, defining an Overall Volume of the electrochemical cell, the overall volume being between about 0.50 cm$^3$ and about 0.60 cm$^3$, the cavity in the anode can comprising a fraction of the overall volume, the fraction being at least 0.59, preferably between about 0.59 and about 0.71, more preferably between about 0.60 and about 0.68, still more preferably between about 0.61 and about 0.66, yet more preferably between about 0.62 and about 0.64, and most preferably the fraction is about 0.63.

Another expression of the invention, where the overall volume is between about 0.50 cm$^3$ and about 0.60 cm$^3$, is that the fraction is between the value represented by the equation 0.65+[Log$_{10}$(Overall Volume)]*0.20 and about the value 0.71, or between the value represented by the equation 0.65+[Log$_{10}$(Overall Volume)]*0.20 and about the value 0.68, or between the value represented by the equation 0.65+[Log$_{10}$(Overall Volume)]*0.20 and the value 0.66, preferably between the value represented by the equation 0.65+[Log$_{10}$(Overall Volume)]*0.20 and the value 0.64, more preferably between the value represented by the equation 0.65+[Log$_{10}$(Overall Volume)]*0.20 and about the value 0.63.

Also related to the first family of embodiments, the invention comprehends an electrochemical cell, comprising an anode, including an anode can and a cavity in the anode can, and anode material in the cavity, including electrochemically reactive material; a cathode, including a cathode can, and a cathode assembly in the cathode can; and a seal between the anode can and the cathode can, the anode and the cathode being joined together, with the seal therebetween and, in combination, defining a top and a bottom of the cell, and a height therebetween and side walls defining a maximum diameter of the electrochemical cell, the height and the maximum diameter, in combination, defining an Overall Volume of the electrochemical cell, the overall volume being between about 0.20 cm$^3$ and about 0.30 cm$^3$, the cavity in the anode can comprising a fraction of the overall volume, the fraction being at least 0.53, preferably between about 0.53 and about 0.64, more preferably between about 0.53 and about 0.60, still more preferably between about 0.53 and about 0.58, yet more preferably between about 0.53 and about 0.56, and most preferably the fraction is about 0.54.

Another expression of the invention, where the overall volume is between about 0.20 cm$^3$ and about 0.30 cm$^3$, is that the fraction is between the value represented by the equation 0.65+[Log$_{10}$(Overall Volume)]*0.20 and about the value 0.64, or between the value represented by the equation 0.65+[Log$_{10}$(Overall Volume)]*0.20 and about the value 0.60, or between the value represented by the equation 0.65+[Log$_{10}$(Overall Volume)]*0.20 and about the value 0.58, preferably between the value represented by the equation 0.65+[Log$_{10}$(Overall Volume)]*0.20 and about the value 0.56, more preferably between the value represented by the equation 0.65+[Log$_{10}$(Overall Volume)]*0.20 and about the value 0.54.

Further related to the first family of embodiments, the invention comprehends an electrochemical cell, comprising an anode, including an anode can and a cavity in the anode can, and anode material in the cavity, including electrochemically reactive material; a cathode, including a cathode can, and a cathode assembly in the cathode can; and a seal between the anode can and the cathode can, the anode and the cathode being joined together, with the seal therebetween and, in combination, defining a top and a bottom of the cell, and a height therebetween and side walls defining a maximum diameter of the electrochemical cell, the height and the maximum diameter, in combination, defining an Overall Volume of the electrochemical cell, the overall volume being between about 0.12 cm$^3$ and about 0.20 cm$^3$, the cavity in the anode can comprising a fraction of the overall volume, the fraction being at least as great as 0.46, preferably between about 0.46 and about 0.55, more preferably between about 0.47 and about 0.53, still more preferably between about 0.48 and about 0.51, yet more preferably about 0.49.

Another expression of the invention, where the overall volume is between about 0.12 cm$^3$ and about 0.20 cm$^3$, is that the fraction is between the value represented by the equation 0.65+[Log$_{10}$(Overall Volume)]*0.20 and about the value 0.55, preferably between the value represented by the equation 0.69+[Log$_{10}$(Overall Volume)]*0.22 and about the value 0.53.

Still further related to the first family of embodiments, the invention comprehends an electrochemical cell, comprising an anode, including an anode can and a cavity in the anode can, and anode material in the cavity, including electrochemically reactive material; a cathode, including a cathode can, and a cathode assembly in the cathode can; and a seal between the anode can and the cathode can, the anode and the cathode being joined together, with the seal therebetween and, in combination, defining a top and a bottom of the cell, and a height therebetween and side walls defining a maximum diameter of the electrochemical cell, the height and the maximum diameter, in combination, defining an Overall Volume of the electrochemical cell, the overall volume being between about 0.06 cm$^3$ and about 0.12 cm$^3$, the cavity in the anode can comprising a fraction of the overall volume, the fraction being at least 0.43, preferably between about 0.43 and about 0.56, more preferably between about 0.44 and about 0.54, still more preferably between about 0.46 and about 0.52, yet more preferably between about 0.47 and about 0.50, and most preferably about 0.48.

Another expression of the invention, where the overall volume is between about 0.06 cm$^3$ and about 0.12 cm$^3$, is that the fraction is between the value represented by the equation $$0.65+[\text{Log}_{10}(\text{Overall Volume})]*0.20$$

and about the value 0.56, preferably between the value represented by the equation $$0.65+[\text{Log}_{10}(\text{Overall Volume})]*0.20$$

and about the value 0.54, more preferably between the value represented by the equation $$0.65+[\text{Log}_{10}(\text{Overall Volume})]*0.20$$

and about the value 0.50, still more preferably between the value represented by the equation $$0.69+[\text{Log}_{10}(\text{Overall Volume})]*0.22$$

and about the value 0.49.

Other objects of the invention are achieved in a second family of embodiments comprehending a novel anode can for use in an electrochemical cell, the anode can having an outer surface to be disposed outwardly in an electrochemical cell when the anode can is assembled thereinto and an inner surface to be disposed inwardly in an electrochemical cell when the anode can is assembled thereinto, the anode can comprising a structure having a first outer layer corresponding with the outer surface, a second inner layer corresponding with the inner surface, and a third layer disposed between the first and second layers, the third layer comprising about 77 percent by weight to about 91 percent by weight, preferably about 80 percent by weight to about 91 percent by weight, more preferably about 83 percent by weight to about 91 percent by weight, still more preferably about 87 percent by weight to about 91 percent by weight, most preferably about 91 percent by weight, of the anode can, and comprising stainless steel, the first and second layers, in combination, comprising about 9 percent by weight to about 23 percent by weight, preferably about 9 percent by weight to about 20 percent by weight, more preferably about 9 percent by weight to about 17 percent by weight, still more preferably about 9 percent by weight to about 13 percent by weight, most preferably about 9 percent by weight, of the anode can, the first layer comprising nickel, and the second layer comprising copper.

In some embodiments, it is preferred that the first layer comprise about 2 percent by weight to about 7 percent by weight of the anode can, and that the second layer comprise about 7 percent by weight to about 16 percent by weight of the anode can.

In other embodiments, it is preferred that the first layer comprise about 2 percent by weight to about 7 percent by weight of the anode can, and that the second layer comprise about 7 percent by weight to about 15 percent by weight of the anode can.

In yet other embodiments, it is preferred that the first layer comprise about 2 percent by weight to about 6 percent by weight of the anode can, and that the second layer comprise about 7 percent by weight to about 11 percent by weight of the anode can.

In highly preferred embodiments, the first layer comprises about 2 percent by weight of the anode can, and the second layer comprises about 7 percent by weight of the anode can.

In this second family of embodiments, the anode can comprises a thickness between the inner and outer surfaces, the thickness being between about 0.110 millimeter and about 0.145 millimeter, preferably between about 0.114 millimeter and about 0.140 millimeter, more preferably about 0.127 millimeter.

This second family of embodiments comprehends electrochemical cells made with anode cans of the invention. Further, this second family of embodiments comprehends an electrochemical cell made with an anode can of the invention, and including a cathode can joined with the anode can, and a seal between the anode can and the cathode can, the cathode can having an outer surface disposed outwardly on the electrochemical cell and an inner surface disposed inwardly in the electrochemical cell, the cathode can comprising a thickness between the inner and outer surfaces, the thickness being between about 0.110 millimeter and about 0.155 millimeter, preferably between about 0.114 millimeter and about 0.140 millimeter, more preferably the thickness being about 0.119 millimeter.

Still further objects are achieved in a third family of embodiments comprehending a cathode can for use in an electrochemical cell, the cathode can having an inner surface to be disposed inwardly in an electrochemical cell when the cathode can is assembled thereinto and an outer surface to be disposed outwardly in an electrochemical cell when the cathode can is assembled thereinto, the cathode can comprising a three-layer structure having a first core layer of cold rolled steel, plated on opposing surfaces with second and third layers of nickel, the cathode can having a thickness between the inner and outer surfaces of about 0.110 millimeter and about 0.155 millimeter, preferably between about 0.114 millimeter and about 0.155 millimeter, more preferably about 0.127 millimeter.

Preferably, the second and third layers are about 0.00165 millimeter (0.000065 inch) to about 0.00215 millimeter (0.000085 inch) thick, the second and third layers corresponding with the inner and outer surfaces of the cathode can and being diffusion bonded to the first layer.

Also preferably, the three-layer structure is annealed after diffusion bonding, and temper rolled after annealing, such that the three-layer structure is both worked hardened and tempered to a temper number corresponding to about Temper 3.5.

Preferably, the cathode can has a bottom, the inner and outer surfaces of the cathode can comprising first inner and first outer surfaces, corresponding with second inner and second outer surfaces of the bottom, the second outer surface having a substantially flat portion extending radially outwardly to a first outer perimeter of the second outer surface, and at least one side wall extending upwardly away from the bottom, the at least one side wall having a third outer surface and a third inner surface, the substantially flat portion of the second outer surface extending radially outwardly of the third inner surface, the outer perimeter preferably being substantially confined radially outwardly of the third inner surface.

The cathode can preferably includes an intermediate element extending between the bottom and the at least one side wall, the intermediate element comprising a fourth outer surface extending between the outer perimeter of the second outer surface of the bottom and the third outer surface of the at least one side wall, the fourth outer surface preferably being substantially confined radially outwardly of the third inner surface.

The intermediate element preferably extends between the bottom and the side wall, the bottom further comprising a first inner perimeter of the second inner surface, the intermediate element comprising a fourth inner surface extending between the first inner perimeter of the second inner surface and the third inner surface of the side wall, the fourth inner surface describing a curvature having an average radius of less than 0.125 millimeter, preferably no more than 0.050 millimeter, more preferably no more than 0.025 millimeter, and wherein it is preferred that the fourth inner surface describe a sharp corner between the second inner perimeter and the third inner surface.

This third family of embodiments comprehends electrochemical cells made with cathode cans of the invention. Further, this third family of embodiments comprehends an electrochemical cell made with a cathode can of the invention, and including an anode can joined with the cathode can, and a seal between the anode can and the cathode can, the anode can having an outer surface disposed outwardly in the electrochemical cell and an inner surface disposed inwardly in the electrochemical cell, the anode can comprising a structure having a first outer layer corresponding with the outer surface, a second inner layer corresponding with the inner surface, and a third layer disposed between the first and second layers, the third layer comprising about 77 percent by weight to about 91 percent by weight, preferably about 80 percent by weight to about 91 percent by weight, more preferably about 83 percent by weight to about 91 percent by weight, still more preferably about 87 percent by weight to about 91 percent by weight, most preferably about 91 percent by weight, of the anode can and comprising stainless steel, the first and second layers, in combination, comprising about 9 percent by weight to about 23 percent by weight, preferably about 9 percent by weight to about 20 percent by weight, more preferably about 9 percent by weight to about 17 percent by weight, still more preferably about 9 percent by weight to about 13 percent by weight, most preferably about 9 percent by weight, of the anode can, the first layer comprising nickel, and the second layer comprising copper. Preferably the first layer comprises about 2 percent by weight of the anode can and the second layer comprises about 7 percent by weight of the anode can.

Yet further objects of the invention are achieved in a fourth family of embodiments comprehending a novel metal-air electrochemical cell, comprising an anode, including an anode can, and a cavity in the anode can, and anode material in the cavity, including electrochemically reactive material; a cathode, including a cathode can, and a cathode assembly in the cathode can; and a seal between the anode can and the cathode can, the anode and the cathode being joined together, with the seal therebetween and, in combination, defining outer walls of the electrochemical cell, the outer walls defining an outer surface of the electrochemical cell, an interior of the electrochemical cell being disposed inwardly of the outer walls, the anode can comprising a structure having a first outer layer comprising an outer surface of the structure and corresponding, in part, with the outer surface of the electrochemical cell, a second inner layer disposed toward the interior of the electrochemical cell and comprising an inner surface of the structure, and a third layer disposed between the first and second layers, the third layer comprising about 77 percent by weight to about 91 percent by weight of the anode can and comprising stainless steel, the first and second layers, in combination, comprising about 9 percent by weight to about 23 percent by weight of the anode can, the first layer comprising nickel and the second layer comprising copper, the cathode can comprising a three-layer structure having a fourth core layer of cold rolled steel, plated on opposing surfaces with fifth and sixth layers of nickel, the fifth and sixth layers being diffusion bonded to the fourth layer, the three-layer structure having been annealed after diffusion bonding, and temper rolled after annealing, such that the three-layer structure is both work hardened, and tempered to about Temper 3.5.

The third layer preferably comprises about 80 percent by weight to about 91 percent by weight, more preferably about 83 percent by weight to about 91 percent by weight, still more preferably about 87 percent by weight to about 91 percent by weight, of the anode can, with the first layer preferably comprising about 2 percent by weight to about 4 percent by weight of the anode can, and the second layer comprising about 7 percent by weight to about 9 percent by weight of the anode can.

Preferably, the anode or the cathode can, or both has a thickness between the outer and inner surfaces thereof of between about 0.110 millimeter and about 0.145 millimeter, preferably between about 0.114 millimeter and about 0.140 millimeter, more preferably about 0.127. The cathode can may have a thickness as great as 0.155 millimeter.

In the metal-air electrochemical cells of the invention, the outer walls define a top and a bottom with a height therebetween, and side walls defining a maximum diameter of the electrochemical cell, the height and the maximum diameter, in combination, defining an overall volume of the cell, the cavity in the anode can comprising a fraction of the overall volume, the fraction being at least as great as the value represented by the expression $$0.65+[\text{Log}_{10}(\text{Overall Volume})]*0.20,$$

characteristically between the value represented by the expression $$0.65+[\text{Log}_{10}(\text{Overall Volume})]*0.20,$$

and up to the value represented by the expression $$0.77+[\text{Log}_{10}(\text{Overall Volume})]*0.20,$$

more characteristically between the value represented by the expression $$0.65+[\text{Log}_{10}(\text{Overall Volume})]*0.20,$$

and up to the value represented by the expression $$0.80+[\text{Log}_{10}(\text{Overall Volume})]*0.281,$$

even more characteristically between the value represented by the expression $$0.69+[\text{Log}_{10}(\text{Overall Volume})]*0.22,$$

and up to the value represented by the expression $$0.77+[\text{Log}_{10}(\text{Overall Volume})]*0.28,$$

and typically the value represented by the expression $$0.69+[\text{Log}_{10}(\text{Overall Volume})]*0.22.$$

In some embodiments of the metal-air cells of the invention, where the overall volume of the cell is between about 0.50 cm$^3$ and about 0.60 cm$^3$, the cavity in the anode can comprises a fraction of the overall volume, between about 0.59 and about 0.71, characteristically between about 0.60 and about 0.68.

In other embodiments of the metal-air cells of the invention, where the overall volume of the cell is between about 0.20 cm$^3$ and about 0.30 cm$^3$, the cavity in the anode can comprises a fraction of the overall volume, between about 0.53 and about 0.64, characteristically between about 0.53 and about 0.60.

In still other embodiments of the metal-air cells of the invention, where the overall volume of the cell is between about 0.12 cm$^3$ and about 0.20 cm$^3$, the cavity in the anode can comprises a fraction of the overall volume, the fraction being between about 0.46 and about 0.55, characteristically between about 0.47 and about 0.53.

In yet other embodiments of metal-air cells of the invention, where the overall volume of the cell is between about 0.06 cm$^3$ and about 0.12 cm$^3$, the cavity in the anode can comprises a fraction of the overall volume, the fraction being between about 0.43 and about 0.56, characteristically between about 0.46 and about 0.52.

DETAILED DESCRIPTION OF THE ILLUSTRATED EMBODIMENTS

Figure 1:
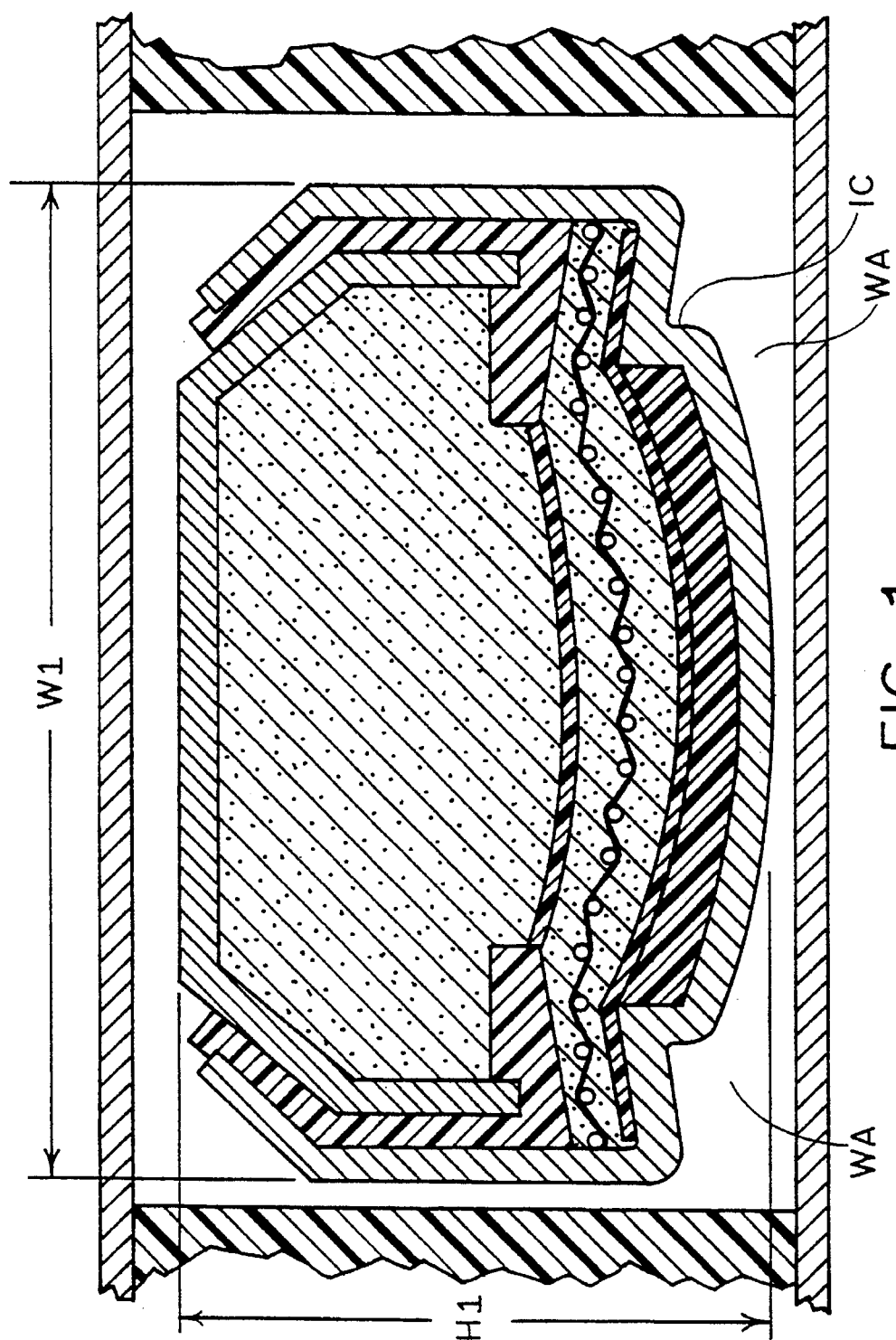
FIG. 1 shows a cross-section of a prior art metal-air electrochemical cell in an appliance, inside the space allocated for the cell.
Figure 2:
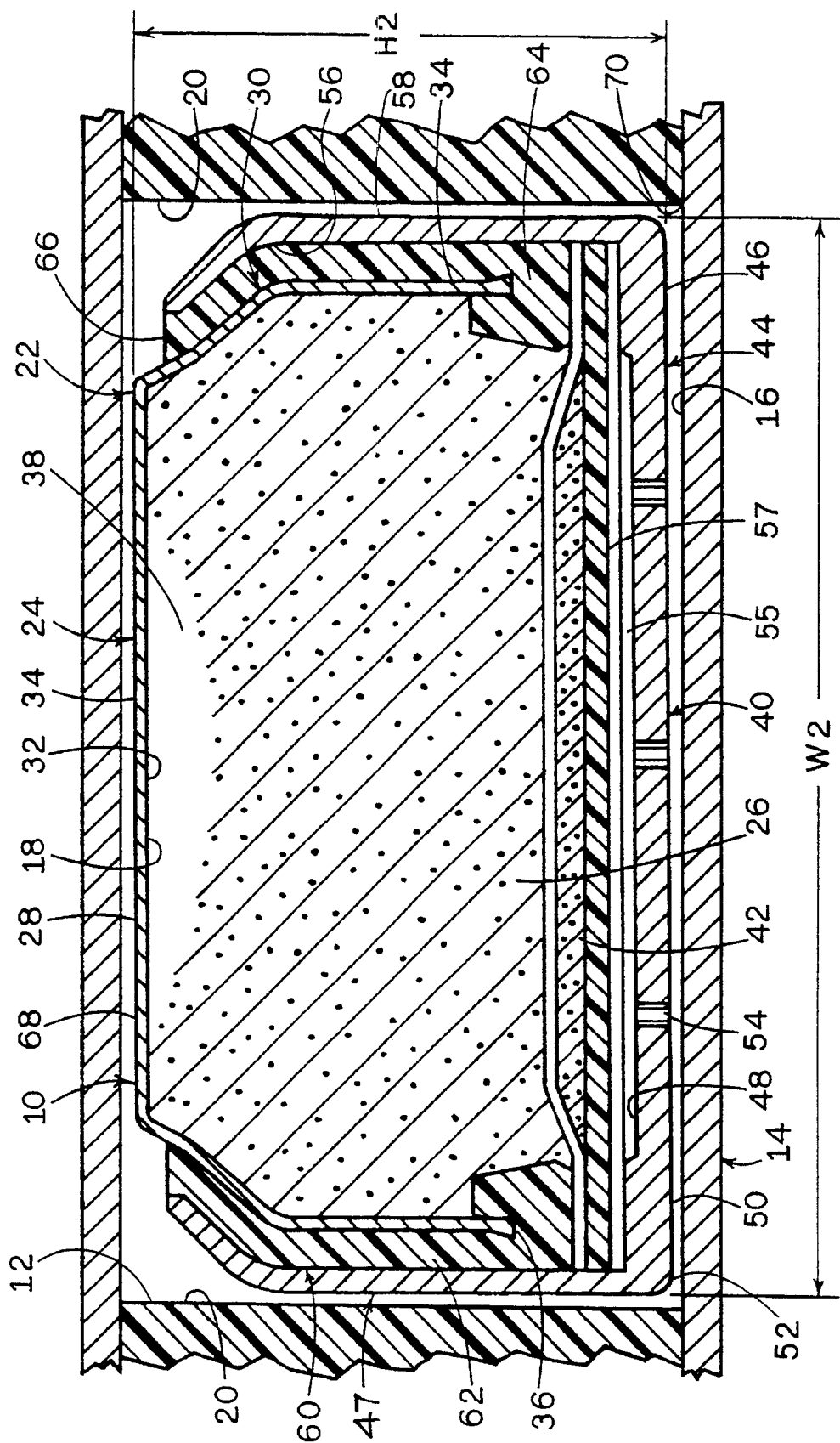
FIG. 2 shows a cross-section of a metal-air electrochemical cell of the invention in a corresponding appliance as in FIG. 1, also inside the space allocated for the cell.

Referring now by characters of reference to the drawings, a comparison of FIGS. 1 and 2 illustrates the general concept of the invention. Referring first to FIG. 2, the cell 10 is disposed inside the space 12 allocated for occupation by the cell, in an appliance 14. As illustrated in FIG. 2, the space 12 is generally bounded by a bottom wall 16 of the appliance, a top wall 18 of the appliance, and side walls 20.

Referring, now, specifically to the cell 10, the negative electrode 22, also referred to as the anode 22, includes an anode can 24 and electrochemically reactive anode material 26 contained therein. The anode can 24 has a top wall 28, and circumferential downwardly-depending side wall 30. Top wall 28 and side wall 30 have, in combination, an inner surface 32 and an outer surface 34. Side walls 30 terminate in a circumferential can foot 36. The top wall 28 and side walls 30 generally define a cavity 38 within the anode can, which cavity 38 contains the anode material 26.

The positive electrode 40, also referred to as the cathode 40, includes a cathode assembly 42, contained within the cathode can 44. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of small ports 54 extend through the bottom 46 of the cathode can, providing avenues for transport of oxygen into the cell adjacent cathode assembly 42. An air reservoir 55 spaces the cathode assembly 42 from bottom 46 and the corresponding ports 54. A porous diffusion layer 57 fills the air reservoir 55. Side wall 47 of the cathode can has an inner surface 56 and an outer surface 58.

The anode 22 is electrically insulated from the cathode 40 by a seal 60. Seal 60 includes a circumferential side wall 62 disposed between the upstanding side wall 47 of the cathode can and the downwardly-depending side wall 30 of the anode can, a seal foot 64 disposed generally between the can foot 36 of the anode can and the cathode assembly 42, and a seal top 66 where the side wall 62 of seal 60 extends from between the side walls 30 and 47 adjacent the top of the cell.

The outer surface 68 of the cell 10 is thus defined by portions of the outer surface 34 of the top of the anode can, outer surface 58 of the side wall 47 of the cathode can, outer surface 50 of the bottom of the cathode can, and the top 66 of the seal 60.

In general, this invention addresses the materials and structures which affect the degree of efficiency with which the cell 10 fills the space 12 with electrochemically reactive material. Accordingly, the invention addresses materials, structures, and methods for improving the efficiency with which the design of the cell 10 fills the space 12 with electrochemically reactive material. To the extent feasible within other constraints on making and using the cell, the cell should have a flat top and a flat bottom. The side wall 47 should meet the bottom 46 at a generally perpendicular angle. The top corner of the cell, adjacent the top 66 of the seal 62 should be as close as possible to the corresponding upper corner of the space 12.

Returning again to the prior art, the cell of FIG. 1 is derived from U.S. Pat. No. Re. 31,143. A comparison of the cell of the prior art shown in FIG. 1 to the cell 10 of the invention illustrated in FIG. 2 suggests the significance of the configuration of the outer walls of the cell to the efficiency with which the cell fills the space 12. First addressing the "clearance" portion of the space 12, the ratio "W1/H1" of the width "W1" of the prior art cell in FIG. 1 to the height "H1" of the cell is less than the ratio "W2/H2" of the width "W2" of the cell of the invention in FIG. 2 to the height "H2" of the cell. The affect of such difference in the W/H ratio's is that the volume defined between the outer surface of the cathode can of the prior art cell of FIG. 1 and the side walls 20 of the space 12 is greater than the volume defined between the outer surface 58 of the cathode can of the invention and the side walls 20 of the space 12. Accordingly, the cell 10 of the invention, as can be seen visually from the comparison of FIGS. 1 and 2, illustrates better use of the first "clearance" portion of the space 12.

Further examination of FIG. 1 illustrates the principle of the fourth portion of the space 12, namely the "wasted" portion of the space. As seen there, the bottom wall of the cathode can is convex, whereby the outer bottom corners of the space are not occupied by the cell but are, rather, vacant and "wasted," as suggested by the designation "WA" therein. The areas designated "WA" also illustrate a second indicator of waste in the in-cut corners "IC" between the convex portion of the bottom and the downwardly inclined portion of the cell which is disposed outwardly thereof but inwardly of the upstanding side wall of the cathode can. The cell 10 of the invention, on the other hand, efficiently uses the outer bottom corners 70 of the space 12, as illustrated in FIG. 2.

Having thus described conceptually the desire to efficiently fill as much as possible of the space 12 with the cell 10, the methods of so filling the space, and of maximizing the fraction of the volume of the cell 10 which is occupied by electrochemically reactive material, will be discussed following.

THE SEAL

Seal 60 performs at least two primary functions. First, the seal serves as a closure for the cell, to prevent anode material and/or electrolyte from leaking from the cell between the outer surface 34 of the side wall 30 of the anode can and the inner surface 56 of the side wall 47 of the cathode can. Thus, the seal must possess adequate liquid sealing properties to prevent such leakage. Generally, such properties are available in a variety of resiliently deformable thermoplastic polymeric materials.

Second, the seal provides electrical insulation, preventing all effective direct electrical contact between the anode can 24 and the cathode can 44. Accordingly, the side wall 62 of the seal must circumscribe, and provide electrical insulation properties about, the entirety of the circumference of the cell between outer surface 34 and inner surface 56, generally from the top of side wall 47 to the bottom of side wall 30. Similarly, the foot 64 of the seal must circumscribe, and provide electrical insulation properties about, the entirety of the circumference of the cell between foot 36 of side wall 30, the lower portion of side wall 47, and the outer perimeter portion of the cathode assembly 42. The combination of good liquid sealing properties and good electrical insulation properties is typically achieved by molding known battery-grade nylon polymeric material in the desired configuration.

To meet the electrical insulation requirements, the seal must have good dielectric insulation properties, must have a minimum thickness about side wall 62, and must be free of any pinholes or other imperfections that might permit transmission of electric current between side walls 30 and 47. Thickness for seal side wall 62 of about 0.200 to about 0.250 millimeter is common in conventional electrochemical cells. Thickness as low as 0.160 millimeter is known.

Applicants have surprisingly discovered that seals thinner than 0.160 millimeter, as thin as 0.100 millimeter, made from the same resiliently deformable thermoplastic nylon material as the thicker 0.160 millimeter seals, exhibit acceptable properties, both liquid seal properties and electrical insulation properties. Depending on the structure of the cell to which the seal is to be applied, intermediate thicknesses such as e.g. 0.150 millimeter, 0.140 millimeter, 0.127 millimeter, or the like, may be selected for some cells. However, where cell volume efficiency is a driving consideration, preferred thicknesses are less, for example 0.120 millimeter or 0.110 millimeter to as thin as 0.100 millimeter. Thus, the range of thicknesses for seals 60 preferred for use in cells 10 of the invention has a lower end of about 0.100 millimeter and an upper end of about 0.150 millimeter. All thicknesses between the lower and upper ends of the range are operable, and thus are included for use in the cells of the invention. Suitable such nylon seals are available from Suratco Products Company, Poynette, Wis. USA.

THE CATHODE ASSEMBLY

Figure 3:
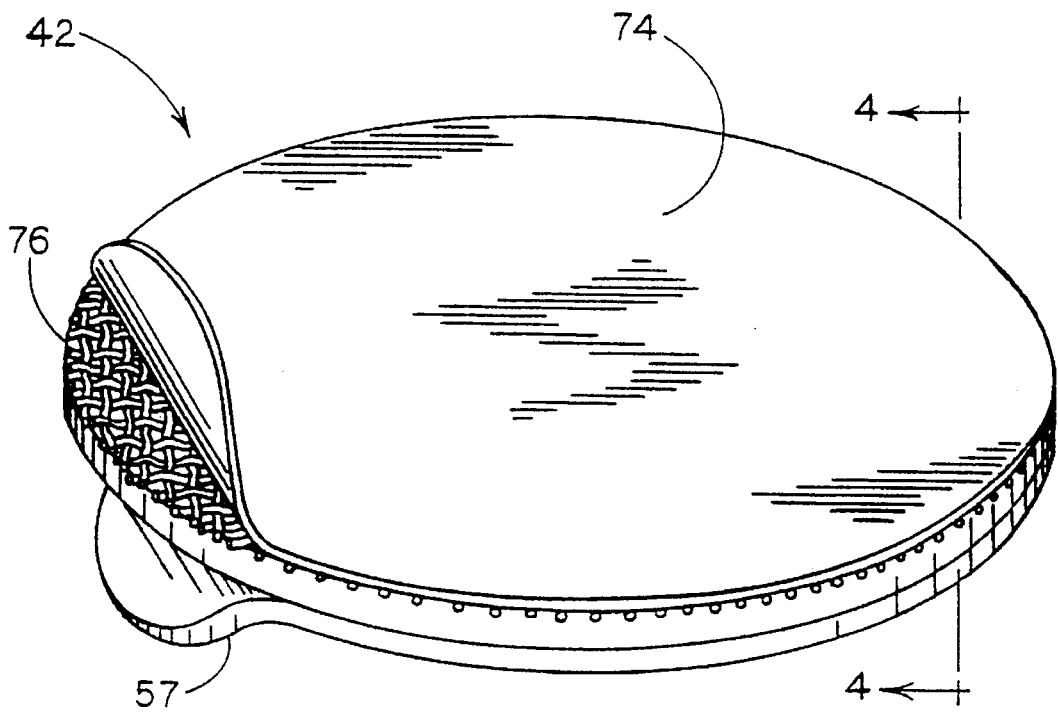
FIG. 3 shows a pictorial view of a cathode assembly used in cells of the invention.

FIG. 3 shows a perspective view of the cathode assembly 42 used in cells representative of the present invention. Active layer 72 of the cathode assembly is interposed between barrier layer 74 and air diffusion layer 57. Active layer 72 ranges preferably between about 0.050 millimeter and about 1.25 millimeter thick, and facilitates the reaction between the hydroxyl in the electrolyte and the cathodic oxygen of the air. Barrier layer 74 is a micro-porous plastic membrane about 0.025 millimeter thick, typically polypropylene, having the primary function of preventing anodic zinc particles from coming into physical contact with the remaining elements of the cathode assembly 42. Barrier layer 74 however, does permit passage of hydroxyl ions and water therethrough.

Air diffusion layer 57 is preferably a micro-porous hydrophobic polymeric material such as a polytetrafluoroethylene (PTFE) membrane about 0.025 to about 0.050 millimeter thick, which permits passage of air therethrough and which is generally impervious to battery electrolyte. The air diffusion layer 57, alone or in combination with the small ports 54, may be used to limit the current density produced by the cell to a desired maximum.

Figure 4:
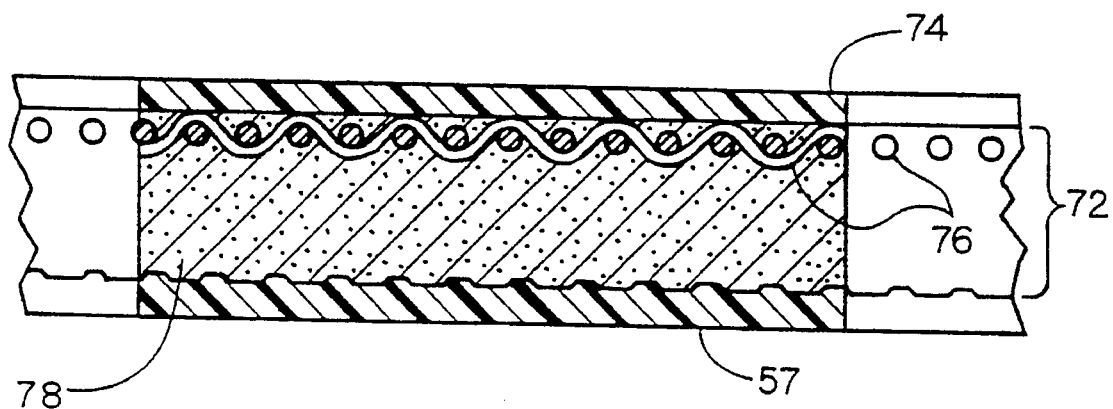
FIG. 4 shows a cross-section of the cathode assembly, taken at 4—4 of FIG. 3.

FIG. 4 is an enlarged perspective view of the cathode assembly 42. Active layer 72 is further comprised of connecting substratum capable of being connected, as a current collector, to electrical circuitry, namely conductive woven nickel wire layer 76. Carbon, indicated at 78, preferably forms a matrix surrounding the conductive layer 76 of nickel wire. Nickel is preferred for layer 76 because nickel exhibits little or no corrosion in the alkaline environment of the zinc-air cell, and also because nickel is an excellent electrical conductor.

In addressing a primary objective of the invention, the thickness of the cathode assembly between the barrier layer 74 and the diffusion layer 57 should desirably be as small as possible. A cathode assembly preferred for use in electrochemical cells of the invention may be made as follows. Place e.g. 1000 milliliters of distilled water in a non-reactive container, and add 19 grams of $KMnO_4$ thereto. Mix this solution for ten minutes. Then slowly add 204 grams of PWA activated carbon having the appropriate particle sizes to the central mix vortex.

PWA activated carbon has the following characteristics: surface area between about 1000 and 1,150 $m^2/g.$, apparent density of about 0.51 g/cc., real density of about 2.1 g/cc., pore volume of about 0.90 g/cc., specific heat at 100 degrees C. of about 0.25, and about 65% by weight to about 75% by weight of such material will pass through a wet −325 U.S. mesh screen.

After 10 minutes of mixing, slowly and uniformly, and without interruption, add 51 grams of Teflon® T-30 dispersant to the edge of the mix vortex, and continue mixing for yet another ten minutes at the speed required to maintain a vortex in the mix after the Teflon dispersant is added. Filter the resulting solution through Whatman #1 or equivalent filter paper, and heat to between 100 degrees C. and 140 degrees C., in a mechanical convection drying oven for at least 16 hours, or until dry, to yield a suitable cake of cathode material.

Combine the resulting cathode material with Black Pearls 2000 carbon black and mix for 30 minutes, or until the mix becomes free flowing. Roll the resulting cathode mix between conventional stainless steel roller mills to obtain the active layer 72. Further details for making such preferred cathode assemblies 42 for use in cells 10 of the invention, including methods for incorporating conductive layer 76 of nickel wire into the cathode assembly, are disclosed in U.S. Pat. No. 5,308,711, herein incorporated by reference.

THE CATHODE CAN

Figure 5:
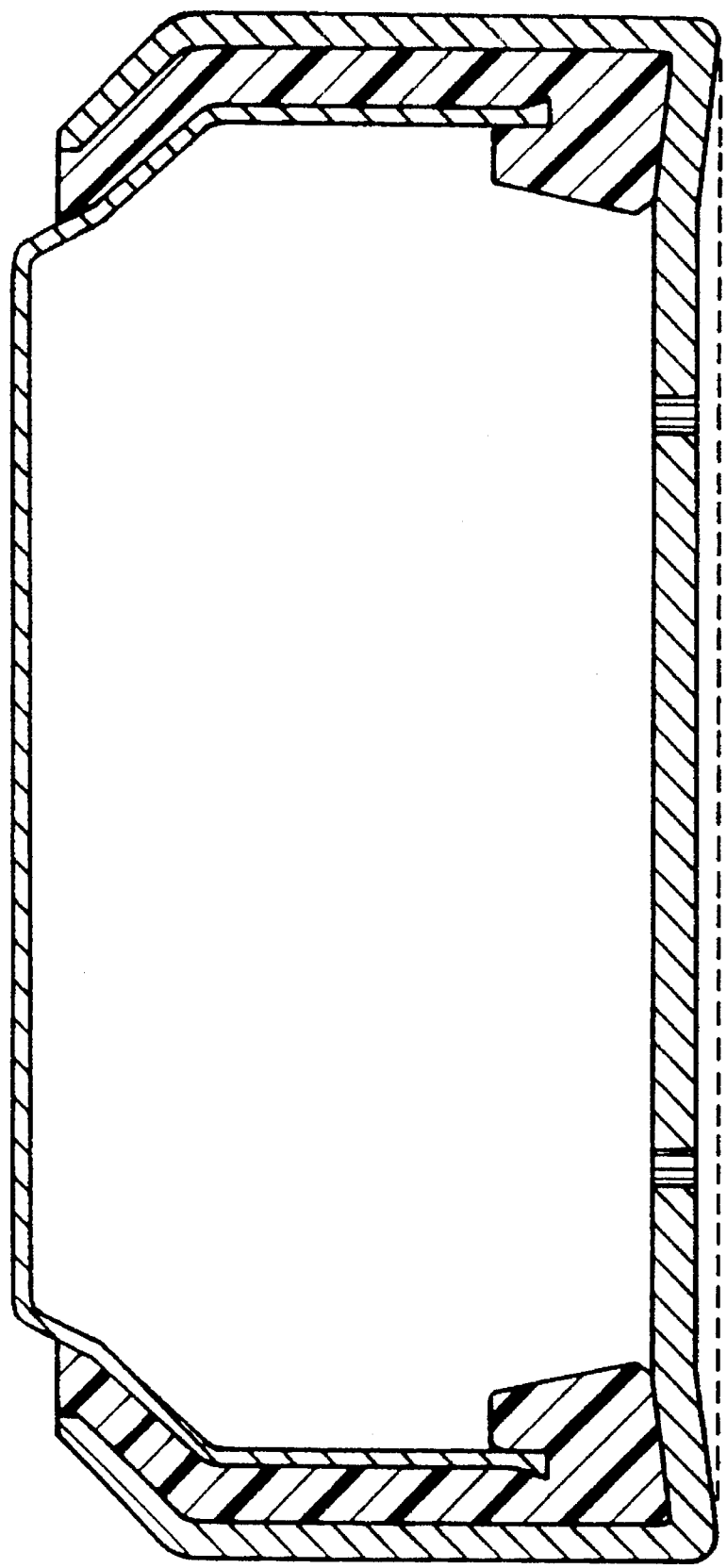
FIG. 5 shows a cross section of an assembly of a cathode can, an anode can, and a seal, illustrating concavity typical of prior art cathode cans.
Figure 5A:
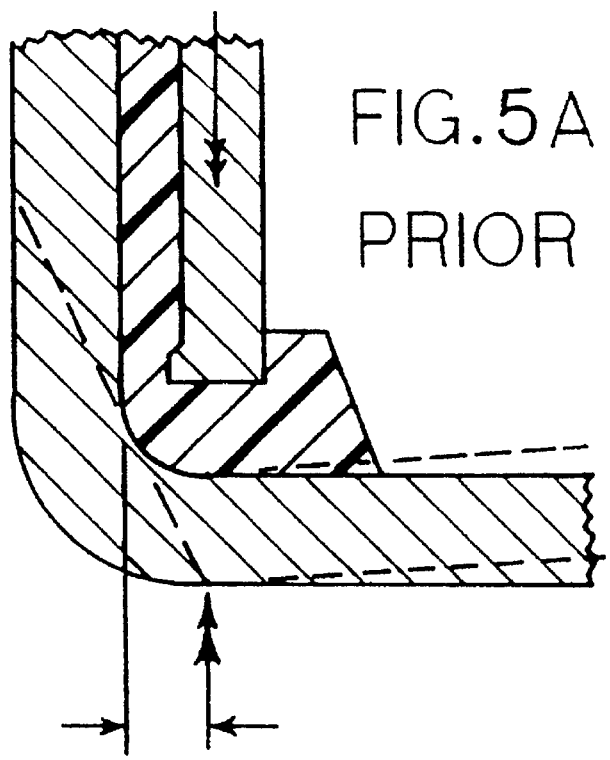
FIG. 5A is an enlarged fragmentary cross-section, showing the corner structure of the prior art cathode can illustrated in FIG. 5.

FIGS. 5 and 5A show a cross section of a prior art assembly of a cathode can, an anode can, and a seal. The dashed line in FIG. 5 represents a straight line across the cathode can between elements of the outer perimeter of the outer surface of the bottom of the cathode can, which straight line would be coincident with a flat bottom on the cathode can. The solid line next above the dashed line represents the actual outer surface of the bottom of the cathode can. FIGS. 5 and 5A illustrate the phenomenon common in cells of the prior art, wherein the bottom of the cathode can is fabricated as a flat bottom, and is permanently displaced upwardly by the force used in joining the cathode and the anode at final assembly of the cell. Such displacement, of course, reduces the usable volume inside the cell, with corresponding reduction in total cell discharge capacity, as well as giving the impression that the cell has been damaged.

Figure 6A:
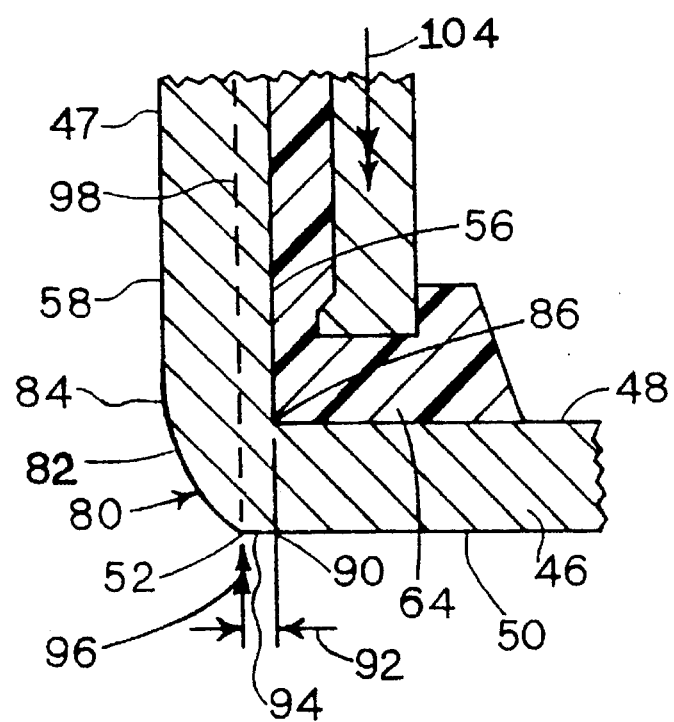
FIG. 6A is an enlarged fragmentary cross-section, showing the corner structure of the cathode can used in the cell of the invention illustrated in FIG. 6.
Figure 6:
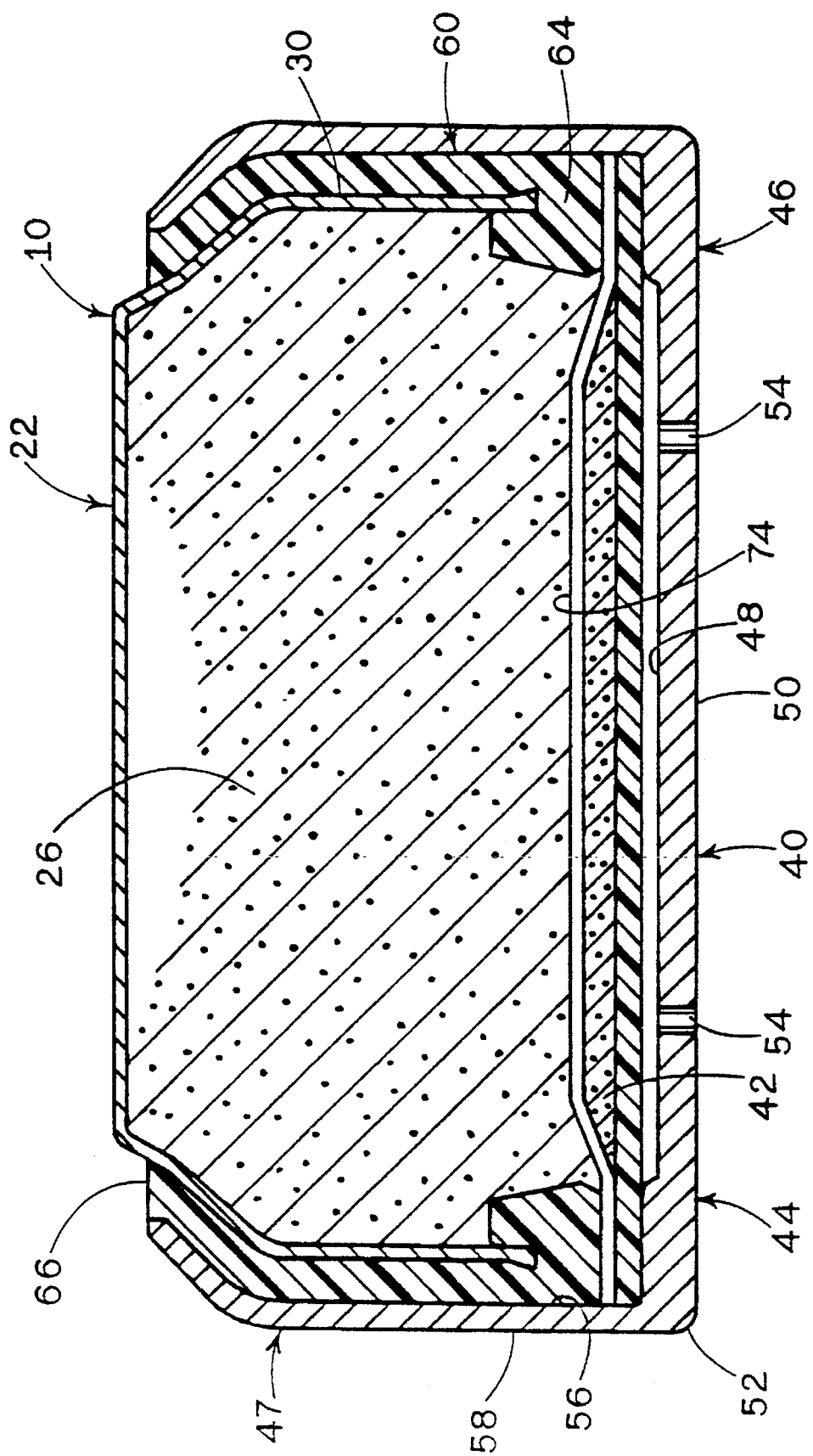
FIG. 6 shows a cross section of an electrochemical cell of the invention.

FIGS. 6 and 6A generally represent improved electrode cans, and corresponding electrochemical cells, provided by the invention. As indicated in FIGS. 6 and 6A, the cell can be closed, and the cathode can crimped about the anode can at final assembly, while maintaining flat the outer surface of the bottom of the cathode can.

FIGS. 6 and 6A generally represent a cross-section of the metal-air cell 10, preferably a zinc-air cell, of the invention, previously discussed generally with respect to FIG. 2. The anode 22 is electrically insulated from the cathode 40 by the nylon or similar seal 60.

Cathode 40 is generally comprised of the cathode assembly 42, contained within cathode can 44. Cathode can 44 has a bottom 46, and circumferential upstanding side wall 47 extending upwardly from the bottom.

The bottom 46 has an outer surface 50. At least a portion of the outer surface 50 is substantially flat, the substantially flat portion extending to an outer perimeter 52, best seen in FIG. 6A. Preferably, the entirety of the outer surface 50 is flat. Bottom 46 further has a generally flat inner surface 48, disposed opposite outer surface 50. Similarly, the side wall 47 has inner surface 56 and outer surface 58, the inner and outer surfaces 56, 58 extending about the circumference of the can, and defining the side wall 47 therebetween.

The side wall 47 is joined to the bottom 46 of the can by intermediate element 80. See FIG. 6A. The outer surface 82 of intermediate element 80 extends, from its lower end at outer perimeter 52 of outer surface 50 of bottom 46, to its upper end 84 which joins the outer surface 58 of the side wall 47 in a generally vertical orientation. The inner surface 86, if any, of the intermediate element 80 is represented at the joinder of the inner surface 48 of the bottom 46 and the inner surface 56 of the side wall 47. In preferred embodiments of the invention, the inner surfaces 48 and 56 come together at a sharp corner, such that the inner surface 86 is of nominal dimension. To the extent the corner material is worked in forming the corner, the corner is work hardened, whereby the corner structure is strengthened with respect to bottom 46 and side wall 47 as the corner structure is formed at intermediate element 80.

Whereas in prior art cathode cans, the inner surface corresponding to 86 describes a radius of e.g. 0.127 mm as illustrated in FIG. 5A, the inner surface 86 of cathode cans of the invention describe a radius of less than 0.125 mm. A radius of 0.075 mm or less is an improvement over the prior art. A radius of 0.050 mm is good, with 0.025 mm being even better. Preferably the coming together of the inner surfaces 48 and 56 describes a sharp interior corner at 86, whereupon the representation of intermediate section 80 is nominal at locus 86. A "sharp interior corner," means that the radius is substantially zero, or as close to zero as can be made with standard machine tools.

As illustrated in FIGS. 6 and 6A, in the illustrated embodiment, the inner surface 56 of the side wall 47 extends generally perpendicular to the outer surface 50 of bottom 46 of the cathode can. As seen therein, a straight line extension of inner surface 56 intersects the outer surface 50 of the bottom 46 at a locus 90 disposed inwardly of the outer perimeter 52. Correspondingly, the outer perimeter 52 extends radially outwardly of the inner surface 56 of the side wall 47.

The dimension between the opposing arrows 92 (FIG. 6A) defines a force transmitting portion 94 of the bottom 46 extending from locus 90 to outer perimeter 52, and upwardly from the outer surface 50 toward the side wall 47, and which transmitting portion 94 can transmit upwardly directed forces from the outer surface 50 to the side wall 47 in a straight line parallel to the inner surface 56 of side wall 47. The upwardly directed double headed arrow 96 in FIG. 6A illustrates a force 102 applied uniformly across the outer surface 50, including at transmitting portion 94, which force is transmitted to the side wall 47 through the force transmitting portion 94 of the bottom 46 between the outer perimeter 52 and the locus 90, locus 90 being projected from inner surface 56 of side wall 47.

As upwardly directed force 102 is applied to bottom 46 at its outer surface 50, the force is transmitted upwardly in a straight line through the transmitting portion 94 defined by the area defined between opposing arrows 92. As illustrated by the upwardly-directed double headed arrow at 96, and the corresponding dashed line 98 extending upwardly from the arrow at 90, such force 102 applies no effective bending moment to the outer surface 50 with respect to the side wall 47, because there is no effective lever arm between the point where the force is applied at transmitting portion 94 and the side wall 47. Rather, the force travels in a straight line direction indicated by the dashed line 98, which is aligned with the direction of application of the force from the outer surface 50, into the side wall 47.

By contrast, and now referring to FIG. 5A, in the prior art structure of the cathode can, the outer perimeter of the flat outer surface of the bottom is disposed inwardly of the projected inner surface of the corresponding side wall, the side wall being generally perpendicular to the bottom wall.

Thus, a vertically directed force applied to the bottom of the can, even at its outer perimeter, such as the force applied to the cathode in joining the anode and cathode and crimping the cathode about the anode and seal, is transmitted upwardly into the side wall along lines extending (i) transverse to the inner surface of the side wall, and (ii) transverse to the direction of application of the vertical force. The corresponding upwardly directed force on the outer surface of the bottom of the cathode can is illustrated in FIG. 5A by the double headed arrow at the outer perimeter of the can bottom. A straight transverse line transmitting that force into the side wall is indicated by the transverse dashed line extending from the double headed arrow at the outer surface of the bottom, (at the outer perimeter) through the corresponding intermediate element and into the side wall. The horizontal component of the line of force represents a lever arm between the bottom of the can and the side wall. Thus, an upwardly directed force on the bottom of the prior art can, as indicated by the double headed arrow in FIG. 5A, exerts a bending moment on the bottom of the can.

Conventional physics analysis teaches that the bending moment is the product of (a) the magnitude of the force applied and (b) the lever arm over which the force is applied. The lever arm is illustrated in FIG. 5A by the opposing arrows at the bottom of the can. Thus, as suggested by the parallel dashed lines along the bottom of the can in FIG. 5A, when force is applied against the bottom of a cathode can of the prior art, the bending moment urges the bottom of the can to deform upwardly. Where, as in closure of the cell, and crimping of the cathode can inwardly on the seal and the anode can, the upwardly directed force is great enough, the bottom of the cathode can may be permanently deformed/displaced by the upwardly directed force, as illustrated in FIGS. 5 and 5A.

Figure 7:
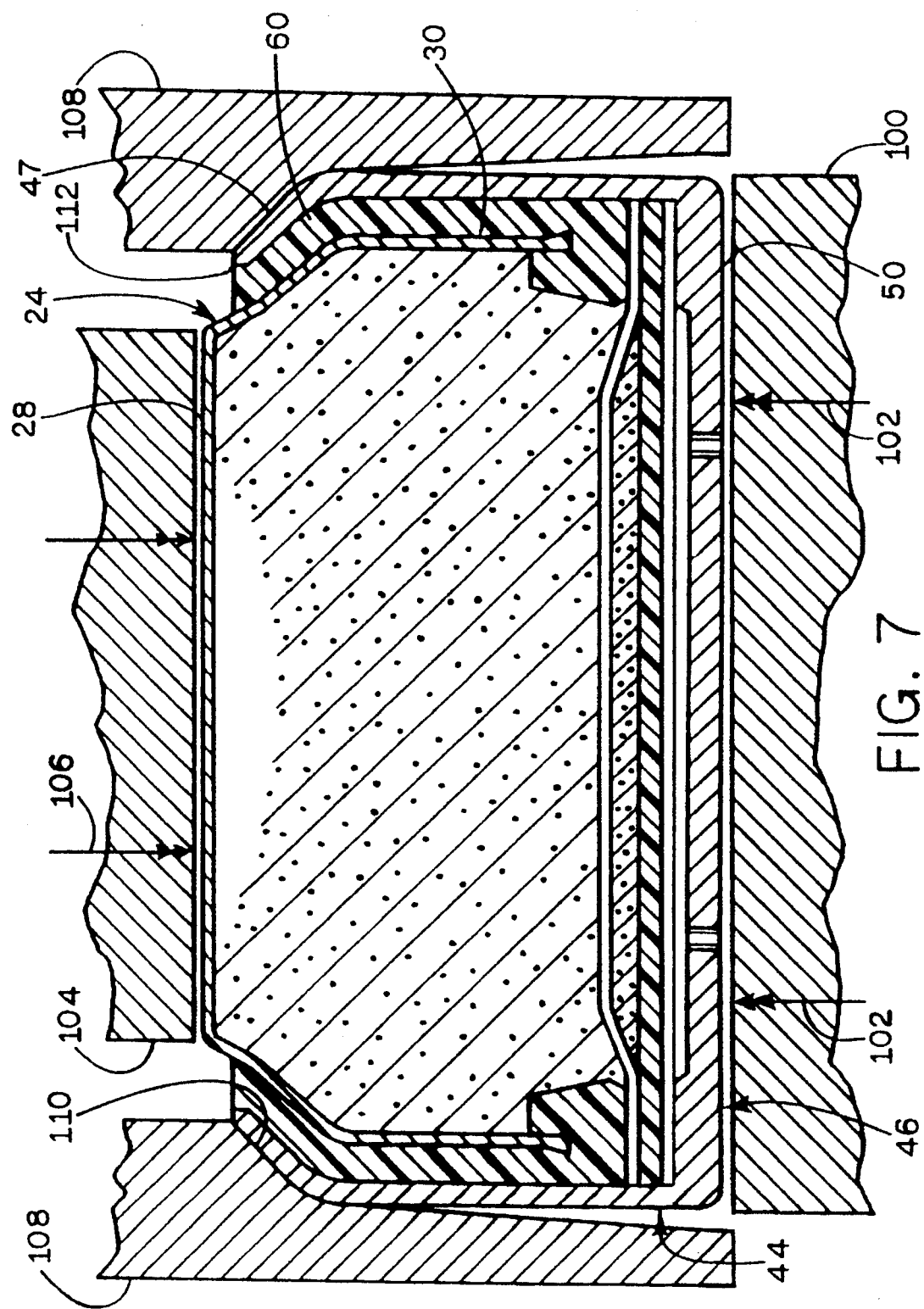
FIG. 7 illustrates the die arrangement, and the final stage of the method used to bring together the anode, the cathode, and the seal, to thereby close and crimp the respective elements in assembly of the cell.

FIG. 7 illustrates the die arrangement, and the final stage of the process of bringing together the anode, the cathode, and the intervening seal, to close the cell and crimp the distal edges of the cathode side wall about the anode. Referring now specifically to FIG. 7, a closing punch 100 exerts an upwardly directed force 102, indicated by the double headed arrows, against the bottom 46 of the cathode can 44. An opposing ejector punch 104 exerts an opposing downwardly directed force 106 of lesser magnitude, indicated by the double headed arrows, against the top wall 28 of the anode can 24. Split closing die 108 generally surrounds the cavity in which the cell is closed and crimped.

As the closing punch 100 exerts the upwardly-directed force 102 indicated by arrows, thus urging the cathode can against the anode can and the seal, the cathode can is moved into the closing die 108 and against the transverse crimping lands 110 of the die. At the same time, the ejector punch 104 exerts its downwardly-directed opposing force 106 against the anode can. In order for the closing punch 100 to force the cathode can closed, it must exert sufficient force to form the crimp on the distal edges 112 of the side wall 47, thus gripping anode can 24 and seal 60 in closure of the cell, as well as sufficient force to overcome the resistance of the downwardly-directed opposing force 104 on the anode can.

The force 104 on the anode can has at least two purposes. First, the force 104 helps stabilize the anode can while the cell is being closed. Second, and referring to FIG. 5A, the force 104 is exerted through seal 60 against the inner surface 48 of the bottom 46 of the cathode can, and thus generally opposes any bending moment which may be imposed on the bottom 46 of the cathode can, thus tending to reduce the deformation suggested in FIG. 5A. The magnitude of the force 104 is generally determined with respect to the need to oppose the bending moment, as the bulk of the force 102 on the cathode can can be absorbed by the vertically stationary elements of closing die 108. Thus, to the extent the need to oppose bending moment on the cathode can is reduced, the magnitude required of the force 106 on the anode can is correspondingly reduced.

The effectiveness of the force 106 in attenuating the tendency of the bottom of the cathode can to deform is related to the magnitudes of the respective forces 102 and 106, the lever arms over which they are applied relative to the respective can side walls, and the thickness and physical properties of the material making up bottom 46. To the extent the thickness of the material is reduced, e.g. to correspondingly increase usable interior volume, the contribution of the metal thickness to resisting bending forces is similarly reduced. Further, the lever arm between the anode can side wall and the cathode can side wall is also reduced when can wall thickness is reduced.

In order for the opposing force 106 to remain effective in stabilizing the bottom 46 as the cell is closed, the magnitude of the force 106 can, in principle, be increased to offset any reduced contributions of the lever arm and the bottom thickness. But as the thickness of the side wall 30 of the anode can is reduced, the capacity of the side wall 30 to tolerate the downward force 106 is reduced. Indeed, the 227 kilograms of force conventionally used with an anode can side wall thickness of 0.203 mm can cause the anode can to collapse during the closing process where the thickness of the side wall is reduced to less than 0.203 mm.

Accordingly, if the thicknesses of the side walls 30, 47 are to be reduced, the magnitude of the force 106 should be reduced, whereby the force 106 is obviated as a mechanism for controlling or eliminating any tendency of the bottom of the cathode can to deform upwardly. But, of course, using the above discussed cathode cans with improved corner structure essentially eliminates the former tendency of the bottom of the cathode can to deform upwardly.

Referring again to FIG. 6A, it is noted that the force transmitting portion 94 is displaced outwardly from the corresponding locus where force is transmitted from the bottom surface of the cathode can in FIG. 5A. Thus, force 102 in FIG. 6A is transmitted from the outer surface 50 of the bottom of the cathode can at portion 94 in a straight line upwardly to the side wall, without imposing any bending moment on the bottom 46. The only bending moment, if any, on the bottom 46 is that small portion of the overall force 102 which corresponds with transferring, to the transmitting portion 94, any force applied to the can inside the inner perimeter of the force transmitting portion 94 e.g. inside the locus defined at 90. Such bending moment, if any, is considerably less than the bending moment applied in FIG. 5A, where all force applied to the bottom of the cathode can produces a bending moment.

Since force 102 applies little or no effective bending moment on bottom 46, little or no opposing force 106 is needed to correct a bending moment from force 102. A direct result of the outward displacement of the force transmitting portion 94 is thus a reduction in the required magnitude of the opposing force 106, from a magnitude of about 227 kilograms using cans of the prior art to a magnitude of about 32 kilograms or less, e.g. using otherwise similar cans preferred in this invention.

Figure 8:
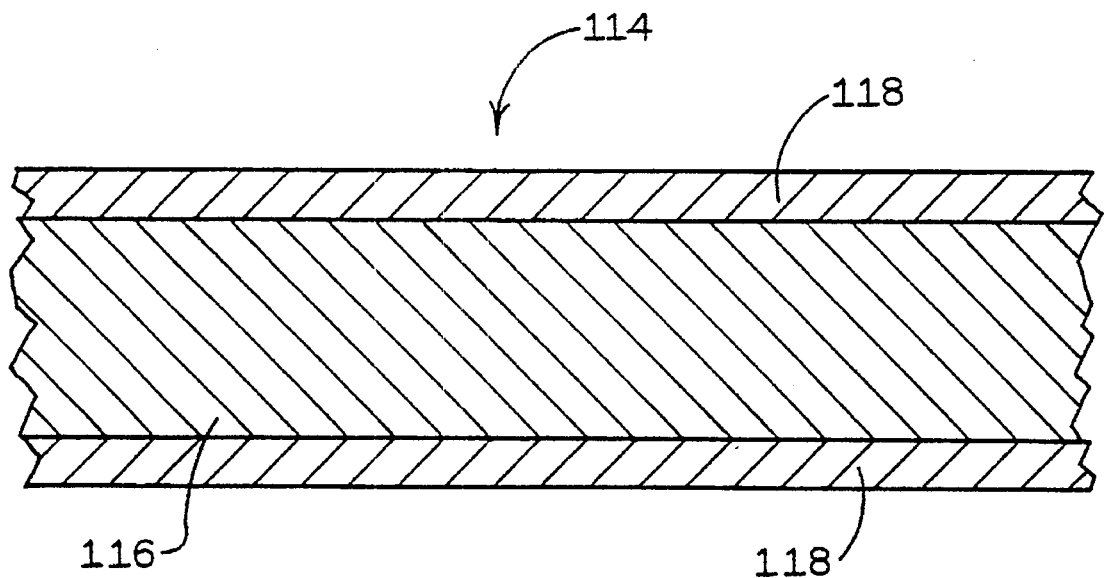
FIG. 8 shows a fragmentary cross-section of metal strip used to make cathode cans of the invention.

In addition to the improvement in the structure of the cathode can which can be obtained from the novel corner structure at intermediate element 80 described above, the ability to reduce the thickness of the cathode can between its inner and outer surfaces, whether at side wall 47 or at bottom 46, is further improved by making the cathode can from a modified metal strip material. For making conventional button-type cells, it is known to use a three-layer metal strip 114, illustrated in FIG. 8, including a core layer 116 of AISI 1008, Aluminum Killed, Battery Grade cold rolled steel, plated on opposing surfaces with layers 118 of nickel, each of the layers 118 being about 0.00165 mm to about 0.00215 mm thick. The plated three-layer structure 114 is diffusion annealed such that the nickel layers 118 are diffusion bonded to the core layer 116. The diffusion annealed three-layer strip 114 is then temper rolled to specified thickness. However, conventionally-known such three layer structures have limited ability to withstand the closing forces 102, 106 as the thickness of the three-layer metal strip 114 is reduced. The inventors herein have surprisingly discovered that the thickness of the metal strip 114 can be further reduced where the physical properties of the metal strip 114 are modified. Table 1 sets forth comparable properties for a metal strip of the invention, as Invention Example #1, and Comparative Example #1 for a prior art metal strip.

As referred to in TABLE 1, and elsewhere herein, the nomenclature used for the Temper of the metal strip 114 is adapted from the Special Temper designation suggested by supplier, Thomas Steel Strip Corporation, Warren, Ohio, from whom the metal strip 114 used in the invention can be obtained. Such metal strip can also be obtained from Hille & Muller, Dusseldorf, Germany. Accordingly, the Temper designations "Temper 4" for the Comparative Prior Art Strip, and "Temper 3.5" for the metal strip 114 used in cathode cans used in the invention represent the combination of physical properties illustrated in TABLE 1. In the temper designation system incorporated into TABLE 1, a lower Temper number generally represents a harder, less ductile material, while a higher Temper number generally represents a softer, more ductile material.

TABLE 1

| Property | Inv. Ex #1 | C Ex 1 |
| --- | --- | --- |
| Temper Number | 3.5 | 4 |
| Grain Size, ASTM E112-88 | 7–12 | 9–12 |
| Yield Strength | 45–52 ksi | 32–45 ksi |
| Elongation, Min, 80–100 mm width | 25% | 35% |
| Hardness | 76–82 | 77–82 |
| Erichsen Ductility ASTM E643-84 | ≧7.5 mm | ≧9.5 mm |

As seen from the properties illustrated in TABLE 1, metal strip 114 used for cathode cans used in cells of the invention has a higher yield strength, less elongation, and is less ductile than conventional metal strips of e.g. Comparative Example 1. Grain size is also reduced to a degree.

The physical properties in TABLE 1 suggest that the metal strip 114 is harder and less formable than conventional battery grade metal strip. Yet battery-forming experiments by the inventors herein show that the modified metal strip 114 is suitable for making batteries using the methods disclosed herein.

The hardness and formability of the strip represent compromises between the need to be able to form the strip in making the cathode can 44, and to crimp the distal edges of the side wall 47 in closing the cell at final assembly, and the desire to obtain as much strength as possible in a minimum thickness. Applicants have discovered that by reducing the thickness of the strip 114, and by also somewhat reducing the formability of the strip 114 as represented by reduced elongation and ductility values, the ability to form the strip is surprisingly preserved, and the strength of the cathode cans formed from the strip is surprisingly preserved at a sufficiently high level that the cans tolerate normal conditions of cell assembly and usage.

Accordingly, metal strip, tempered as above, and suitable for forming cathode cans of the invention for use in metal-air cells, may be preferably about 0.110 mm to about 0.155 mm thick, more preferably about 0.114 mm to about 0.150 mm thick, still more preferably about 0.114 mm to about 0.140 mm thick, most preferably about 0.119 mm to about 0.127 mm thick.

The retention of the flat configuration at the bottom of the can provides a corresponding increase in the useful volume inside the cell, which translates almost completely, though somewhat indirectly, to an increase in space which can be filled with additional reactive material.

EXAMPLE OF CATHODE CAN CORNER STRUCTURE

Nickel plated steel 0.150 mm thick is obtained from Hille & Muller, Dusseldorf, Germany. The metal is fabricated into cathode cans using a press having three draw stations. Prior to fabrication in the press, the metal is lubricated with forming lubricant. At Draw Station No. 1, a cup representing a rough approximation of the finished can is stamped in the metal strip. At Draw Station No. 2, the cup is further worked, to more closely approach the dimensions of the finished can. At Draw Station No. 3, the final can dimensions are generated. After Draw Station No. 3, the workpiece/cup is separated from the metal strip and trimmed, to complete fabrication of the cathode can.

Figure 9A:
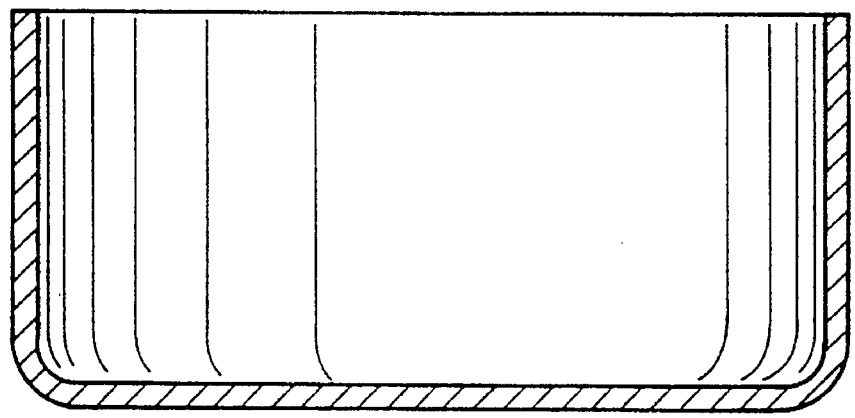
FIGS. 9A–9C show cross-sections of cathode can preforms, illustrating stages of fabrication of cathode cans of the invention.
Figure 9B:
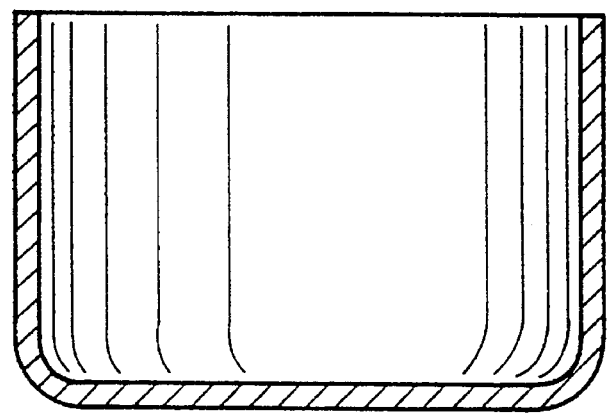
Figure 9C:
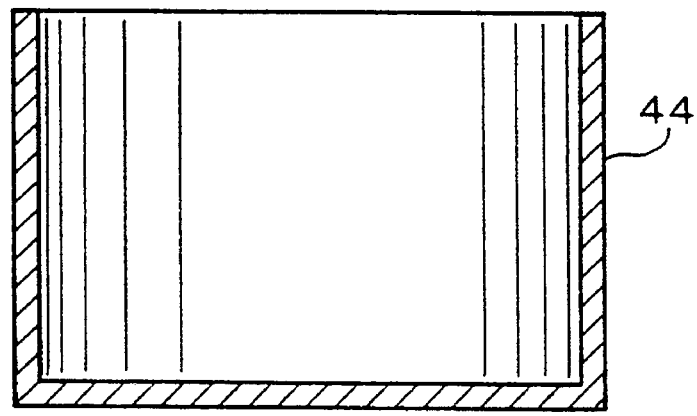

FIGS. 9A–9C illustrate the progressive formation of the workpiece at the three draw stations. Following Table 2 illustrates the conditions of the workpiece at the conclusion of operation at each draw station.

"O/Dia" means outside diameter of the workpiece.

"I/Dia" means inside diameter of the workpiece.

"Depth" refers to the inside depth of the workpiece.

"Radius" refers to the radius described by the surface corresponding to inner surface 86 of the intermediate element 80 at the respective draw stations.

TABLE 2

| Station No. | O/Dia | I/Dia | Depth | Radius |
| --- | --- | --- | --- | --- |
| 1 (FIG. 9A) | 9.80 mm | 9.49 mm | 3.76 mm | .800 mm |
| 2 (FIG. 9B) | 8.54 mm | 8.23 mm | 4.82 mm | .400 mm |
| 3 (FIG. 9C) | 7.75 mm | 7.44 mm | 5.43 mm | Sharp |

A suitable cathode assembly 42 is placed in the cathode can. A suitable anode, including anode can and anode material are selected. The anode, a suitable seal 60, and the cathode are placed in juxtaposed position with respect to each other and the anode and seal are urged part-way into the cathode can, to thus partially close the cell, and prepare it for final closure and sealing.

The partially closed cell is then placed in a closing assembly including a closing punch 100, closing die 108, and ejector punch 104, all as illustrated in FIG. 7. Closing punch 100 then applies closing force 102 against the outer surface 50 of the bottom 46 of the cathode can while ejector punch 104 applies opposing force 106 of lesser magnitude. Under the influence of forces 102 and 106, the cathode, the anode, and the seal move together into the closing die 108 and the cathode is fully seated over the anode. As the cathode, the anode, and the seal move into the closing die, the distal edge 112 of cathode side wall 47 is engaged by the crimping lands 110 of the split closing die 108, crimping the edge 112 inwardly against seal 60 and anode can 24, and thus closing and sealing the cell 10. By the time the cell has been so closed, the force 102 applied by the closing punch 100 reaches about 445 kilograms, and the opposing force 106 reaches about 32 kilograms. The resulting cell is structurally sound. The bottom is not dished. All components meet desired dimension specifications.

The above structural improvements in the corner of the electrode can can be practiced using a variety of metal structures. Strength and ductility are the important physical characteristics of the electrode can. The improved corner structure cans may be formed of virtually any metal that is plated or clad with the appropriate metal, such appropriate metal having a hydrogen overvoltage similar to that of the corresponding electrode and being insoluble at high pH's (or in the presence of electrolyte), the metal plating or cladding being in chemical communication via the electrolyte with the electrode material, if not in direct physical contact therewith.

Optionally, the can may be formed entirely of a metal or alloy having a hydrogen overvoltage similar to that of the electrode (as opposed to plating or cladding the can) so long as sufficient strength and ductility are available from the material selected. In addition to nickel, stainless steel, palladium, silver, platinum, and gold may be suitable plating, cladding, or can materials. Steel strip plated with nickel and nickel alloy is generally used because the cost is low, and because pre-plated steel strip, which generally requires no post-plating processes, is commercially available. The metal in the can must be ductile enough to withstand the drawing process, and strong enough to withstand the cell crimping and closure process.

Cathode cans, for example, may be made of cold-rolled steel plated with nickel. Steel strip pre-plated with nickel can also be used. Cathode cans may also be formed from cold-rolled mild steel, with at least the inside portions of the cans being subsequently post plated with nickel. Other examples of materials for cathode cans include nickel-clad stainless steel; nickel-plated stainless steel; INCONEL (INCO alloy of nickel, a non-magnetic alloy); pure nickel with minor alloying elements (NICKEL 200 and related family of NICKEL 200 alloys such as NICKEL 201, etc.), all available from Huntington Alloys, a division of INCO, Huntington, W.Va. Some noble metals may also find use as plating, cladding, or can metals, including steel strip plated with nickel, and mild steel strip subsequently plated with nickel after forming the can.

In order to obtain the advantages of the Temper 3.5 metal strip, one, of course, must select appropriate materials and utilize proper metal processing steps, as illustrated above, to obtain the balance of properties of hardness and ductility which provide sufficient strength for the thinner can wall while tolerating the forming steps wherein the can is formed from the metal strip, and wherein the cathode can is crimped about the seal 60 and the anode can. Given the above teaching of Temper and related properties, those skilled in the art can now apply the principles taught therein to a variety of the above related metals and structures.

The process described above for forming cathode cans from metal strip, to obtain the improved corner structure, and intermediate element 80, is also useful for making anode cans having related improvements in physical properties. Such making of anode cans is, of course, practiced using metal structures compatible with the polarity of the anode.

THE ANODE CAN

Figure 10:
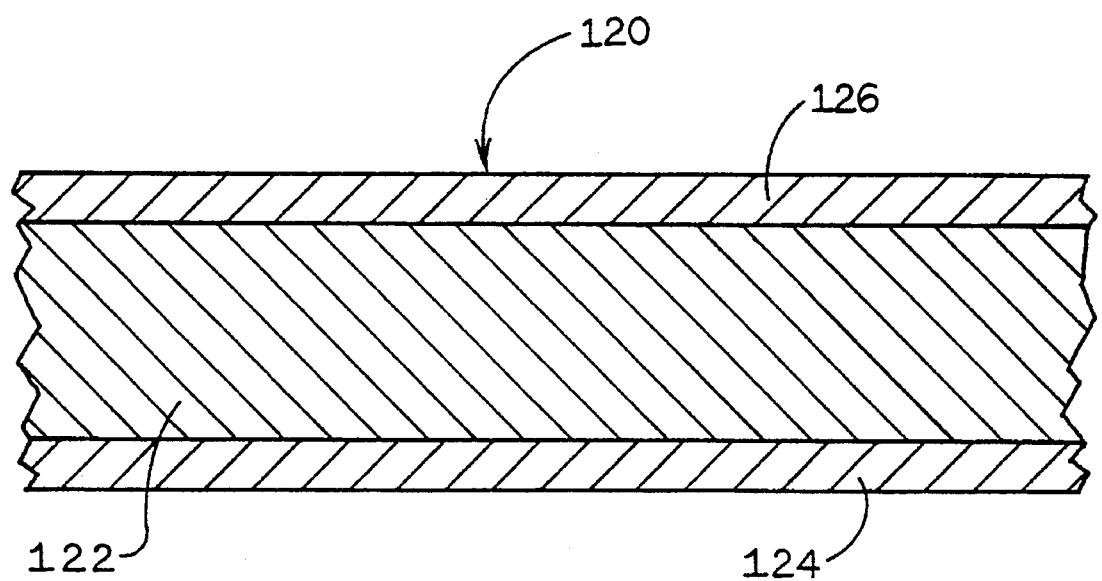
FIG. 10 shows a fragmentary cross-section of metal strip used to make anode cans of the invention.

For example, an anode can is preferably plated with copper on its inner surface. Copper has a hydrogen overvoltage similar to that of zinc. An anode can is readily formed of stainless steel wherein the inner surface 32 is plated with copper, and the outer surface 34 is plated with nickel. As illustrated in FIG. 10, typical anode cans comprise a metal strip 120 having a three-layer structure including a core layer 122 of e.g. 304 stainless steel, plated on opposing surfaces with outer layers 124 and 126 of copper and nickel, respectively.

As with other aspects of this invention, the thickness of the metal strip 120 used to form the anode can is desirably reduced to a value less than thicknesses for conventionally known such elements.

In conventional metal strip material used to make anode cans, about 76 percent by weight of the metal is contained in the core layer 122 of stainless steel, about 16 percent by weight is contained in the inner copper layer 124, and about 8 percent by weight is contained in the outer nickel layer 126. Accordingly, with all expressions being percent by weight represented by the respective layer, the structure can be expressed, layer for layer, as /16% Cu/76% SS/8% Ni/.

The strength of the above metal strip structure is provided by a combination of (a) thickness of the structure, and (b) the combined strengths of the materials in the individual layers. Regarding materials, the stainless steel provides proportionately more strength than the copper or the nickel. The inventors have surprisingly discovered that the fraction of the metal strip comprising the stainless steel layer can be increased, thus providing greater strength per unit of thickness, while maintaining suitable forming properties for forming anode cans and reducing the overall thickness of the three-layer metal strip. Thus, a three-layer structure of the above nature, having the combination of suitable forming properties along with sufficient strength, stiffness, and crush resistance in the anode can, can be made into anode cans when the relative amounts of the layers 122, 124, and 126 are revised to increase the relative amount of the stainless steel layer 122. The following structures illustrate that the amount of stainless steel can be increased by up to about 20% over the conventional structures, from 76% stainless steel to about 91% stainless steel. "Cu" is copper. "SS" is stainless steel. "Ni" is nickel. All expressions are percent by weight. Exemplary such structures are:

/16% Cu/82% SS/2% Ni/

/ 7% Cu/91% SS/2% Ni/

The above two structures of metal strip 120, for making anode cans of the invention, are merely illustrative of the full range of structures that can be made wherein the common feature is the increase in the amount of stainless steel relative to the amount of copper and/or nickel. Accordingly, the weight of the copper layer can range from about 7% to about 16% of the weight of the three-layer metal strip, and the weight of the nickel layer can range from about 2% to about 7% by weight of the three layer metal strip. So long as the stainless steel content is increased above the conventionally known level of about 76%, the strength of the metal strip 120, for any given thickness, is improved. Thus, the metal strip 120 of the invention allows for reduction in thickness while maintaining the strength of the anode can.

Preferred steps in the development of structures having increasing amounts of the stainless steel layer, and thus higher strength/thickness ratio, produce anode cans having progressively, 77% stainless steel, 80% stainless steel, 83% stainless steel, 87% stainless steel, and 91% stainless steel, with corresponding 20%, 17%, 13%, and 9% as the corresponding combined amounts of the copper and nickel layers 124 and 126. Preferred steps in development of structures for metal strip 120 having decreasing amounts of the copper layer 124 are 15% copper, 11% copper, and 7% copper. Preferred steps in development of structures having decreasing amounts of the nickel layer 126 are 7% nickel, 6% nickel, 3% nickel, and 2% nickel. The full range of the structures specified can be obtained from Sumitomo Metals Company, Japan, the most preferred such structure having the designation "high strength CSTN-12," an annealed and work-hardened product.

It is contemplated that the operation and functions of the invention have become fully apparent from the foregoing description of elements, but for completeness of disclosure the overall scope of the invention will be briefly described.

VOLUME EFFICIENCIES

Figure 11:
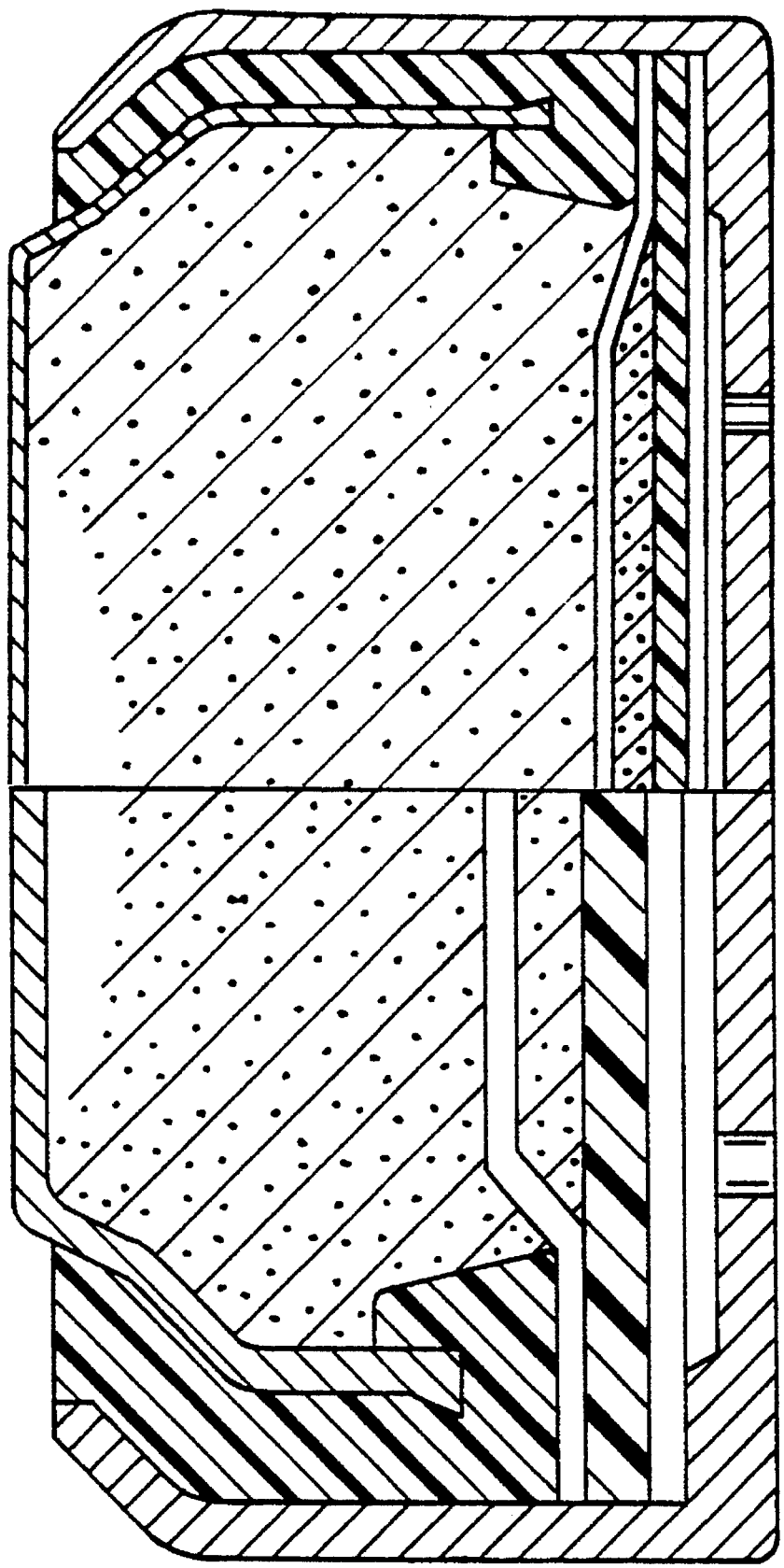
FIG. 11 shows a split-half, side-by-side cross-section comparison of two halves of a metal air cell, illustrating the volume gains achieved using the invention.

The volume efficiencies of cells of the invention are obtained as a result of the combination of numerous reductions in space usage for various of the non-reactive elements of the cell, primarily structural elements inside the cell related to the second portion of the space 12. FIG. 11 shows a cross-section of a cell wherein the left half of the cell uses conventional thicker materials of construction while the right half of the cell uses the thinner materials of construction disclosed herein, illustrating the greater volume which can be gained for use in containing additional electrochemically reactive anode material 26 e.g. anodic zinc paste. As illustrated in FIG. 11, in cells of the invention, thicknesses have been reduced at least in one or more, preferably all of the following—anode can 24, cathode can 44, cathode assembly 42, and seal 60.

Figure 12:
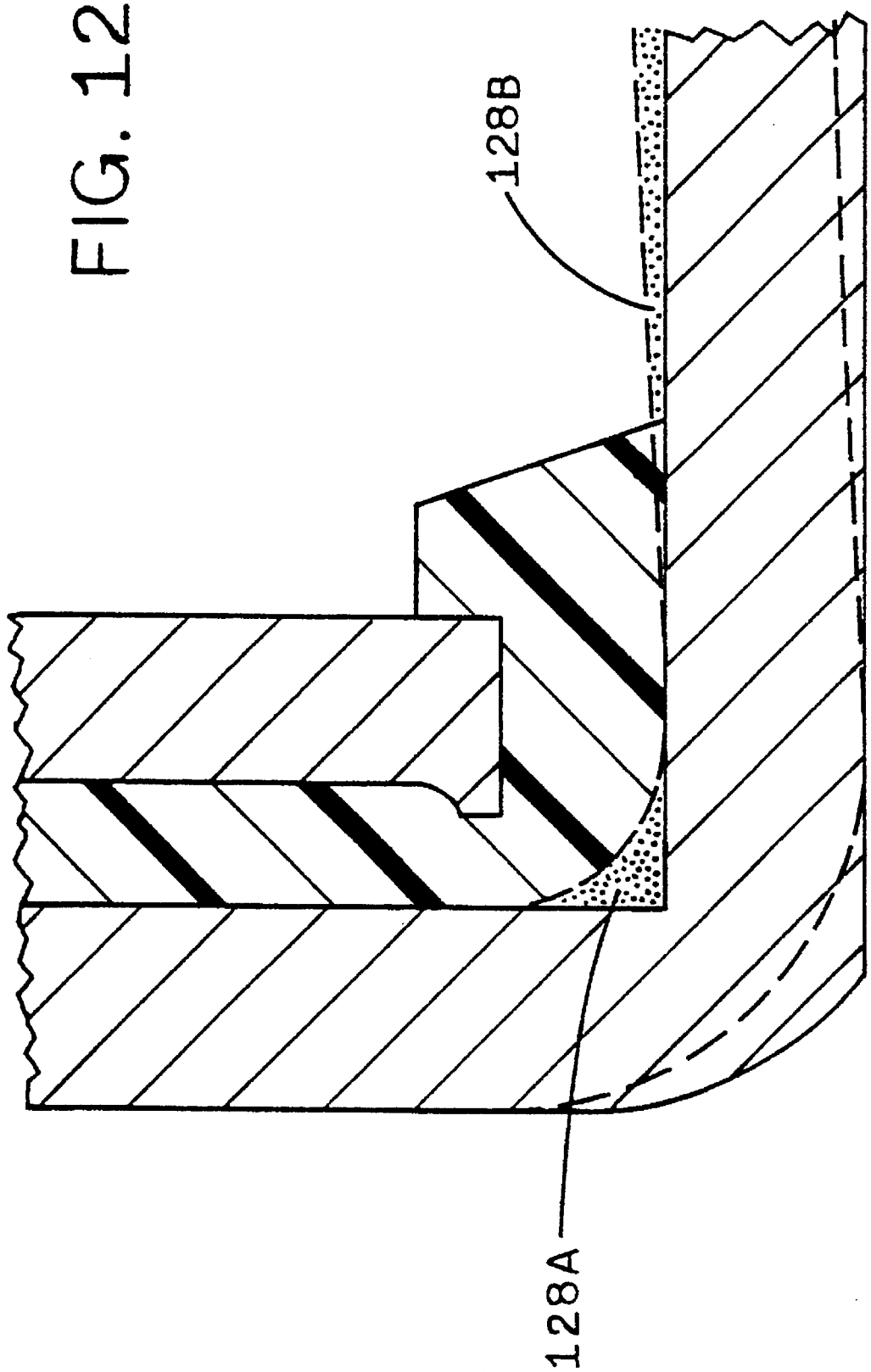
FIG. 12 is an enlarged fragmentary cross-section, showing corner structure of improved cathode cans as in FIG. 6A, with dashed lines superposed thereon showing volume gains attributable to the improved corner structure.

FIG. 12 shows a cross-section of the corner area of the cathode can as in FIG. 6A, with the prior art rounded corner construction superimposed in dashed outline. Stippled areas 128A and 128B illustrate gains in internal cell volume attributable to the sharp corner structure described with respect to FIG. 6A.

Table 3 gives data regarding various non-reactive elements of cells of the invention, illustrating the Volume Efficiencies obtained thereby. The volume efficiencies obtained in the invention readily translate into corresponding increases in the overall potential milliampere-hour capacities of the corresponding cells.

Sizes referred to in Table 3 represent designations of the IEC. For Examples 2 and 3, along with Comparative Examples 4–8, the cell Overall Volume is about 0.55 cm$^3$. For Examples 9 and 10, along with Comparative Examples 11–15, the cell Overall Volume is about 0.25 cm$^3$. For Examples 16 and 17, along with Comparative Examples 18–22, the cell Overall Volume is about 0.16 cm$^3$. For Examples 23 and 24, along with Comparative Examples 25–26, the cell Overall Volume is about 0.090 cm$^3$.

Overall Volume for both the Examples of the invention and the Comparative Examples is calculated using average height and diameter for the respective size, based on IEC standards, and assuming a cylindrical configuration.

The term "Volume Efficiency" means the fraction of the overall volume, generally referred to as a decimal fraction, which is defined by the cavity 38. Referring to FIG. 1, cavity 38 is defined between the top and side walls 28 and 30 of the anode can, and the cathode assembly 42. Thus, the larger the cavity 38, the higher is the Volume Efficiency of the cell.

volume Efficiency is expressed as a fraction of the Overall Volume of the cell, Volume Efficiency being measured as the composite of thin horizontal slices of the cell, top to bottom, where each slice is e.g. 0.5 millimeter thick.

TABLE 3

| SIZE PR44 Data Measured | Ex. 2 | Ex 3 | C Ex 4 | C Ex 5 | C Ex 6 | C Ex 7 | C Ex 8 |
|---|---|---|---|---|---|---|---|
| Overall Height* | .2070 | .2070 | .2070 | .2070 | .2070 | .2070 | .2070 |
| Overall Dia*1 | .4550 | .4550 | .4550 | .4550 | .4550 | .4550 | .4550 |
| Overall Vol** | .5515 | .5515 | .5515 | .5515 | .5515 | .5515 | .5515 |
| Anode Top*2 | .0050 | .0075 | .0100 | .0102 | .0075 | .0100 | .0088 |
| AnodeSidewall*2 | .0050 | .0075 | .0100 | .0100 | .0093 | .0235 | .0088 |
| Seal Sidewall*2 | .0040 | .0100 | .0105 | .0108 | .0085 | .0092 | .0121 |
| Cathode Can*2 | .0047 | .0065 | .0080 | .0100 | .0070 | .0087 | .0104 |
| Seal Foot*2 | .0270 | .0287 | .0305 | .0383 | .0285 | .0429 | .0376 |
| Cathode*2 | .0100 | .0126 | .0142 | .0152 | .0171 | .0169 | .0264 |
| To 1st Radius*3 | .1395 | .1373 | .1395 | .1238 | .0965 | .1529 | .1277 |
| Anode Top*1 | .2870 | .2851 | .2780 | .3005 | .2812 | .2774 | .3070 |
| Anode Volume** | .3915 | .3456 | .3177 | .3039 | .3102 | .3106 | .2875 |
| Vol Efficiency | 71% | 63% | 58% | 55% | 56% | 56% | 52% |

| SIZE PR48 Data Measured | Ex 9 | Ex 10 | C Ex 11 | C Ex 12 | C Ex 13 | C Ex 14 | C Ex 15 |
|---|---|---|---|---|---|---|---|
| Overall Height* | .2070 | .2070 | .2070 | .2070 | .2070 | .2070 | .2070 |
| Overall Dia*1 | .3050 | .3050 | .3050 | .3050 | .3050 | .3050 | .3050 |
| Overall Vol** | .2478 | .2478 | .2478 | .2478 | .2478 | .2478 | .2478 |
| Anode Top*2 | .0050 | .0060 | .0080 | .0097 | .0069 | .0073 | .0061 |
| AnodeSidewall*2 | .0050 | .0060 | .0080 | .0107 | .0082 | .0134 | .0126 |
| Seal Sidewall*2 | .0040 | .0078 | .0090 | .0062 | .0082 | .0081 | .0129 |
| Cathode Can*2 | .0047 | .0080 | .0080 | .0094 | .0068 | .0077 | .0076 |
| Seal Foot*2 | .0240 | .0263 | .0291 | .0317 | .0289 | .0376 | .0238 |
| Cathode*2 | .0100 | .0142 | .0157 | .0264 | .0247 | .0219 | .0230 |
| To 1st Radius*3 | .1273 | .1221 | .1273 | .1292 | .1146 | .1462 | .1499 |
| Anode Top*1 | .1740 | .1740 | .1608 | .1782 | .1560 | .1798 | .1826 |
| Anode volume** | .1586 | .1344 | .1235 | .1157 | .1180 | .1278 | .1239 |
| Vol Efficiency | 64% | 54% | 50% | 47% | 48% | 52% | 50% |

SIZE PR41

TABLE 3-continued

| Data Measured | Ex 16 | Ex 17 | C Ex 18 | C Ex 19 | C Ex 20 | C Ex 21 | C Ex 22 |
|---|---|---|---|---|---|---|---|
| Overall Height* | .1350 | .1350 | .1350 | .1350 | .1350 | .1350 | .1350 |
| Overall Dia*1 | .3050 | .3050 | .3050 | .3050 | .3050 | .3050 | .3050 |
| Overall Vol** | .1616 | .1616 | .1616 | .1616 | .1616 | .1616 | .1616 |
| Anode Top*2 | .0050 | .0061 | .0080 | .0076 | .0068 | .0058 | .0058 |
| AnodeSidewall*2 | .0050 | .0061 | .0080 | .0173 | .0143 | .0108 | .0129 |
| Seal Sidewall*2 | .0040 | .0067 | .0093 | .0083 | .0085 | .0079 | .0095 |
| Cathode Can*2 | .0047 | .0080 | .0080 | .0099 | .0065 | .0075 | .0081 |
| Seal Foot*2 | .0233 | .0209 | .0227 | .0379 | .0312 | .0294 | .0217 |
| Cathode*2 | .0100 | .0118 | .0123 | .0258 | .0233 | .0221 | .0250 |
| To 1st Radius*3 | .0597 | .0597 | .0542 | .0791 | .0663 | .0804 | .0818 |
| Anode Top*1 | .1700 | .1746 | .4738 | .1717 | .1582 | .1763 | .1548 |
| Anode Volume** | .0887 | .0785 | .0718 | .0611 | .0647 | .0721 | .0680 |
| Vol Efficiency | 55% | 49% | 44% | 38% | 40% | 45% | 42% |

| SIZE PR70 Data Measured | Ex 23 | Ex 24 | C Ex 25 | C Ex 26 |
|---|---|---|---|---|
| Overall Height* | .1350 | .1350 | .1350 | .1350 |
| Overall Dia*1 | .2880 | .2880 | .2880 | .2880 |
| Overall Vol** | .0903 | .0903 | .0903 | .0903 |
| Anode Top*2 | .0050 | .0060 | .0060 | .0080 |
| AnodeSidewall*2 | .0050 | .0060 | .0060 | .0080 |
| Seal Sidewall*2 | .0040 | .0063 | .0113 | .0101 |
| Cathode Can*2 | .0047 | .0060 | .0080 | .0083 |
| Seal Foot*2 | .0233 | .0246 | .0266 | .0264 |
| Cathode*2 | .0100 | .0100 | .0100 | .0258 |
| To 1st Radius*3 | .0723 | .0752 | .0752 | .0641 |
| Anode Top*1 | .1250 | .1151 | .1151 | .1186 |
| Anode Volume** | .0506 | .0436 | .0377 | .0331 |
| Vol Efficiency | 56% | 48% | 42% | 37% |

Figure 13:
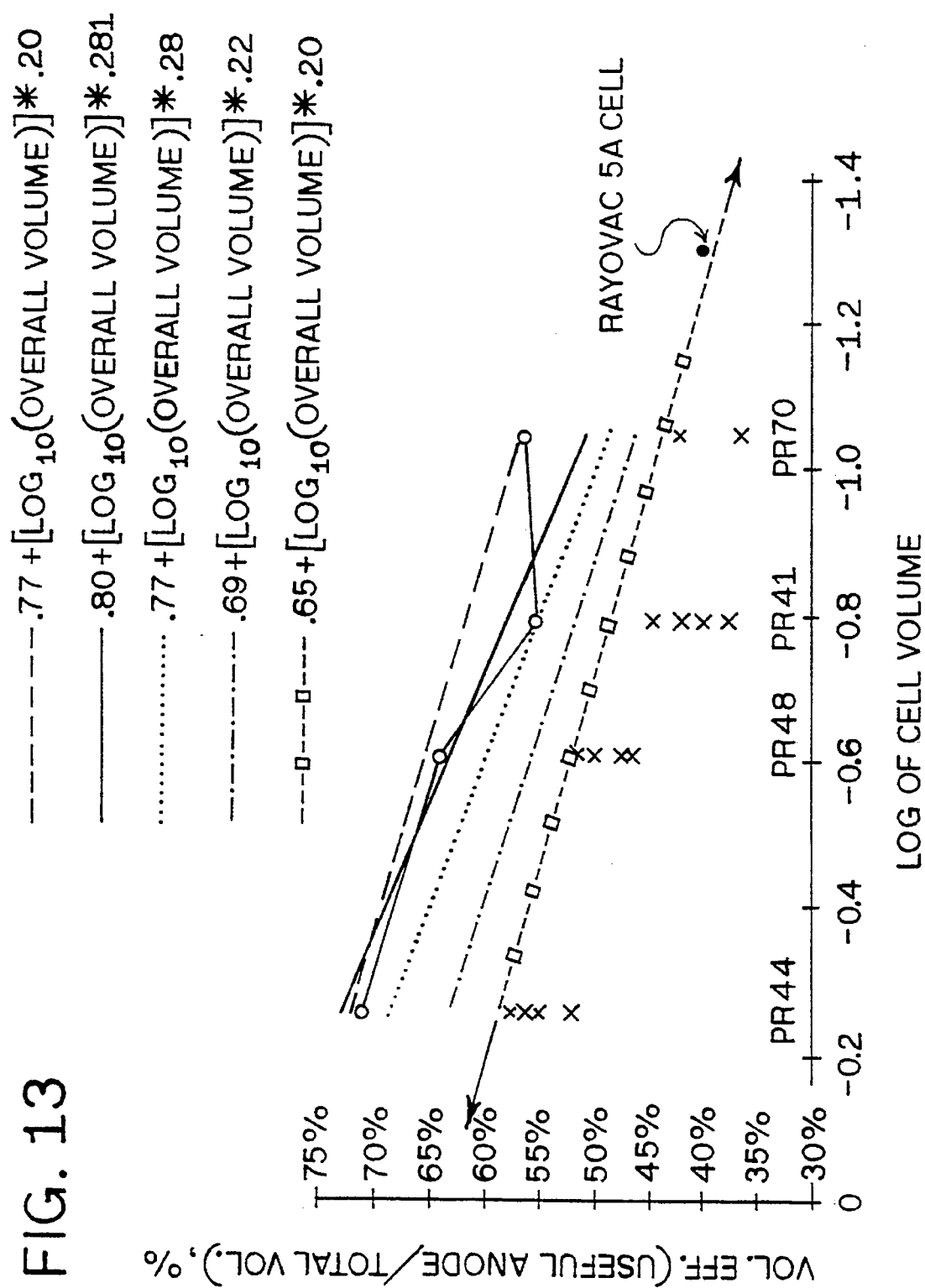
FIG. 13 is a graph illustrating Volume Efficiencies of cells of the invention, compared with conventional cells.

\* = Dimension in Inches
\*\* = Dimension in Cubic Centimeters
1 = Diameter
2 = Thickness
3 = Height FIG. 13 is a graphical representation, with logarithmic scale on the X-axis, of the Volume Efficiencies shown in Table 3. The "X's" in FIG. 13 represent Volume Efficiencies of the Comparative Example cells. The "o's" represent Volume Efficiencies of the cells of respective Examples 2, 9, 16, and 23.

Examples 2, 9, 16, and 23 represent generally the upper portion of the range of volume efficiencies that can be achieved using the teachings herein, wherein the upper portion of the range is generally represented by the equation shown as a first line in FIG. 13 and expressed as $$0.77 + [\text{Log}_{10}(\text{Overall Volume})]*0.20.$$

Linear Regression Analysis of the values represented by Examples 2, 9, 16, and 23 is shown as a second line in FIG. 13, represented by the equation $$0.80 + [\text{Log}_{10}(\text{Overall Volume})]*0.281.$$

A third line, generally connecting the points for Examples 2 and 16, suggests an equation of $$0.77 + [\text{Log}_{10}(\text{Overall Volume})]*0.20.$$

A fourth line, representing the equation $$0.69 + [\text{Log}_{10}(\text{Overall Volume})]*0.22$$

represents generally an incremental step in improving Volume Efficiency, using the concepts of the invention.

The equation $$0.65 + [\text{Log}_{10}(\text{Overall Volume})]*0.20$$

generally represents a line showing a minimum improvement over all prior art cells.

Table 4 gives representative values for the several equations used in FIG. 13 at the size designations given in Table 3.

TABLE 4

| Equation Valued | PR44 | PR48 | PR41 | PR70 |
|---|---|---|---|---|
| .77 + [Log$_{10}$ (Overall Volume)]* .20 | .7184 | .6489 | .6119 | .5608 |
| .80 + [Log$_{10}$ (Overall Volume)]* .281 | .7275 | .6298 | .5779 | .5061 |
| .77 + [Log$_{10}$ (Overall Volume)]* .28 | .6977 | .6004 | .5487 | .4772 |
| .69 + [Log$_{10}$ (Overall Volume)]* .22 | .6332 | .5568 | .5161 | .4599 |
| .65 + [Log$_{10}$ (Overall Volume)]* .20 | .5984 | .5289 | .4919 | .4408 |

Especially referring, now, to size PR41 cells, some improvement is seen at Volume Efficiencies below those represented by the equation 0.65+[Log$_{10}$(Overall Volume)]*0.20.

While the equation 0.65+[Log$_{10}$(Overall Volume)]*0.20 represents a general lower end of the range of improvements which can be obtained using principles of the invention, the invention provides incremental improvements based on the degree to which space is recovered for use in cavity 38. Where only small amount of space are recovered, the improvement in Volume Efficiency is correspondingly smaller. Where larger amounts of space are recovered, the improvement is larger. Thus, the Volume Efficiency for a given cell depends on the degree to which the Efficiency-boosting measures of the invention are implemented. Where only nominal measures are taken, Volume Efficiency will be closer to the line represented by the equation $$0.65 + [\text{Log}_{10}(\text{Overall Volume})] * 0.20.$$

To the extent more extensive measures are taken, Volume Efficiency will be closer to the line represented by the equation $$0.77 + [\text{Log}_{10}(\text{Overall Volume})] * 0.20,$$

and where thickness reductions are pushed to the limits given for each non-reactive element of the cell, Volume Efficiencies can be slightly higher than those represented by the last recited equation, whereby the equation is not absolutely limiting of the Volume Efficiencies which can be obtained using the principles of the invention.

Certainly all Volume Efficiencies between the lines represented by the last two above equations are contemplated by the invention, generally across all the cell sizes shown, and all sizes which can be extrapolated, both from the data in Table 3 and from the equations given above.

As seen in FIG. 13, the Volume Efficiencies of the Comparative Examples all fall below a line represented by the equation $$0.65 + [\text{Log}_{10}(\text{Overall Volume})] * 0.20.$$

Examples 3, 10, 17, and 24, and are generally represented by the equation $$0.69 + [\text{Log}_{10}(\text{Overall Volume})] * 0.22.$$

Those skilled in the art will now see that certain modifications can be made to the cells and their elements, and methods for making and using them, herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. An electrochemical cell, comprising:
   (a) an anode, including (i) an anode can and (ii) a cavity in said anode can, and anode material in said cavity, including electrochemically reactive anode material; and
   (b) a cathode, including a cathode can, and a cathode assembly in said cathode can,
said anode can and said cathode can being joined together, with a seal therebetween and, in combination, defining a top and a bottom of said cell with a height therebetween, and side walls defining a maximum diameter of said electrochemical cell, said height and said maximum diameter, in combination, defining an overall volume of said electrochemical cell, said cavity in said anode can comprising a fraction of said overall volume, said fraction being at least as great as the value represented by the equation $$0.65 + \text{Log}^{10}(\text{Overall Volume}) * 0.20.$$

2. An electrochemical cell as in claim 1, said fraction being at least as great as the value represented by the equation $$0.69 + [\text{Log}_{10}(\text{Overall Volume})] * 0.22.$$

3. An electrochemical cell as in claim 2, said anode can and said cathode can having corresponding first and second wall thicknesses between about 0.114 millimeter and about 0.150 millimeter, said seal having a thickness, between said anode can and said cathode can of about 0.100 millimeter to about 0.150 millimeter.

4. An electrochemical cell as in claim 3, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

5. An electrochemical cell as in claim 3, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

6. Am electrochemical cell as in claim 2, said anode can comprising a structure having a first outer layer corresponding with the outer surface of said electrochemical cell, a second inner layer disposed toward said cavity, and a third layer between said first and second layer, said third layer comprising about 77 percent by weight to about 91 percent by weight of said anode can and comprising stainless steel, said first and second layers, in combination, comprising about 9 percent by weight to about 23 percent by weight of said anode can, said first layer comprising nickel, and said second layer comprising copper.

7. An electrochemical cell as in claim 2, said anode can comprising a structure having a first outer layer corresponding with the outer surface of said electrochemical cell, a second inner layer disposed toward said cavity, and a third layer between said first and second layers, said third layer comprising about 80 percent by weight to about 91 percent by weight of said anode can and comprising stainless steel, said first and second layers, in combination, comprising about 9 percent by weight to about 20 percent by weight of said anode can, said first layer comprising nickel, and said second layer comprising copper.

8. An electrochemical cell as in claim 2, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

9. An electrochemical cell as in claim 2, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

10. An electrochemical cell as in claim 2, anode can having a top, and a first side wall depending downwardly from said top, said first side wall having first inner and outer surfaces, said cathode can having a bottom, and a second side wall extending upwardly from said bottom, said second side wall having second inner and outer surfaces, said seal having a third side wall between said anode can and said cathode can, said third side wall having a thickness between said first outer surface of said first side wall and said second inner surface of said second side wall, the thickness of said third side wall being between about 0.100 millimeter and about 0.150 millimeter.

11. An electrochemical cell as in claim 2, anode can having a top, and a first side wall depending downwardly from said top, said first side wall having first inner and outer surfaces, said cathode can having a bottom, and a second side wall extending upwardly from said bottom, said second side wall having second inner and outer surfaces, said seal having a third side wall between said anode can and said cathode can, said third side wall having a thickness between said first outer surface of said first side wall and said second inner surface of said second side wall, the thickness of said third side wall being between about 0.110 millimeter and about 0.140 millimeter.

12. An electrochemical cell as in claim 1, said fraction being at least as great as the value represented by the equation $$0.65+[\text{Log}_{10}(\text{Overall Volume})]*0.20,$$

up to the value represented by the equation $$0.77+[\text{Log}_{10}(\text{Overall Volume})]*0.20.$$

13. An electrochemical cell as in claim 12, said anode can and said cathode can having corresponding first and second wall thicknesses between about 0.114 millimeter and about 0.150 millimeter, said seal having a thickness, between said anode can and said cathode can of about 0.100 millimeter to about 0.150 millimeter.

14. An electrochemical cell as in claim 13, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

15. An electrochemical cell as in claim 13, said anode can comprising a structure having a first outerlayer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

16. An electrochemical cell as in claim 12, said anode can comprising a structure having a first outer layer corresponding with the outer surface of said electrochemical cell, a second inner layer disposed toward said cavity, and a third layer between said first and second layers, said third layer comprising about 77 percent by weight to about 91 percent by weight of said anode can and comprising stainless steel, said first and second layers, in combination, comprising about 9 percent by weight to about 23 percent by weight of said anode can, said first layer comprising nickel, and said second layer comprising copper.

17. An electrochemical cell as in claim 12, said anode can comprising a structure having a first outer layer corresponding with the outer surface of said electrochemical cell, a second inner layer disposed toward said cavity, and a third layer between said first and second layers, said third layer comprising about 80 percent by weight to about 91 percent by weight of said anode can and comprising stainless steel, said first and second layers, in combination, comprising about 9 percent by weight to about 20 percent by weight of said anode can, said first layer comprising nickel, and said second layer comprising copper.

18. An electrochemical cell as in claim 12, said anode can comprising a structure having a first outer layer corresponding with the outer surface of said elcetrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

19. An electrochemical cell as in claim 12, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

20. An electrochemical cell as in claim 1, said fraction being at least as great as the value represented by the equation $$0.65+[\text{Log}_{10}(\text{Overall Volume})]*0.20,$$

up to the value represented by the equation $$0.80+[\text{Log}_{10}(\text{Overall Volume})]*0.281.$$

21. An electrochemical cell as in claim 20, said anode can and said cathode can having corresponding first and second wall thicknesses between about 0.114 millimeter and about 0.150 and said cathode can of about 0.100 millimeter to about 0.150 millimeter.

22. An electrochemical cell as in claim 21, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

23. An electrochemical cell as in claim 21, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

24. An electrochemical cell as in claim 20, said anode can comprising a structure having a first outer layer corresponding with the outer surface of said electrochemical cell, a second inner layer disposed toward said cavity, and a third layer between said first and second layers, said third layer comprising about 77 percent by weight to about 91 percent by weight of said anode can and comprising stainless steel, said first and second layers, in combination, comprising about 9 percent by weight to about 23 percent by weight of said anode can, said first layer comprising nickel, and said second layer comprising copper.

25. An electrochemical cell as in claim 20, said anode can comprising a structure having a first outer layer corresponding with the outer surface of said electrochemical cell, a second inner layer disposed toward said cavity, and a third layer between said first and second layers, said third layer comprising about 80 percent by weight to about 91 percent by weight of said anode can and comprising stainless steel, said first and second layers, in combination, comprising about 9 percent by weight to about 20 percent by weight of said anode can, said first layer comprising nickel, and said second layer comprising copper.

26. An electrochemical cell as in claim 20, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, and first layer comprising nickel, and said second layer comprising copper.

27. An electrochemical cell as in claim 20, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

28. An electrochemical cell as in claim 1, said fraction being at least as great as the value represented by the equation $$0.65 + [\text{Log}_{10}(\text{Overall Volume})]*0.20,$$

up to the value represented by the equation $$0.77 + [\text{Log}_{10}(\text{Overall Volume})]*0.28.$$

29. An electrochemical cell as in claim 28, said anode can and said cathode can having corresponding first and second wall thicknesses between about 0.114 millimeter and about 0.150 millimeter, said seal having a thickness, between said anode can and said cathode can of about 0.100 millimeter to about 0.150 millimeter.

30. An electrochemical cell as in claim 29, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

31. An electrochemical cell as in claim 29, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

32. An electrochemical cell as in claim 28, said anode can comprising a structure having a first outer layer corresponding with the outer surface of said electrochemical cell, a second inner layer disposed toward said cavity, and a third layer between said first and second layers, said third layer comprising about 77 percent by weight to about 91 percent by weight of said anode can and comprising stainless steel, said first and second layers, in combination, comprising about 9 percent by weight to about 23 percent by weight of said anode can, said first layer comprising nickel, and said second layer comprising copper.

33. An electrochemical cell as in claim 28, said anode can comprising a structure having a first outer layer corresponding with the outer surface of said electrochemical cell, a second inner layer disposed toward said cavity, and a third layer between said first and second layers, said third layer comprising about 80 percent by weight to about 91 percent by weight of said anode can and comprising stainless steel, said first and second layers, in combination, comprising about 9 percent by weight to about 20 percent by weight of said anode can, said first layer comprising nickel, and said second layer comprising copper.

34. An electrochemical cell as in claim 28, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

35. An electrochemical cell as in claim 28, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

36. An electrochemical cell as in claim 28, anode can having a top, and a first side wall depending downwardly from said top, said first side wall having first inner and outer surfaces, said cathode can having a bottom, and a second side wall extending upwardly from said bottom, said second side wall having second inner and outer surfaces, said seal having a third side wall between said anode can and said cathode can, said third side wall having a thickness between said first outer surface of said first side wall and said second inner surface of said second side wall, the thickness of said third side wall being between about 0.100 millimeter and about 0.150 millimeter.

37. An electrochemical cell as in claim 28, anode can having a top, and a first side wall depending downwardly from said top, said first side wall having first inner and outer surfaces, said cathode can having a bottom, and a second side wall extending upwardly from said bottom, said second side wall having second inner and outer surfaces, said seal having a third side wall between said anode can and said cathode can, said third side wall having a thickness between said first outer surface of said first side wall and said second inner surface of said second side wall, the thickness of said third side wall being between about 0.110 millimeter and about 0.140 millimeter.

38. An electrochemical cell as in claim 1, said fraction being at least as great as the value represented by the equation $$0.69+[\text{Log}_{10}(\text{Overall Volume})]*0.22,$$

up to the value represented by the equation $$0.77+[\text{Log}_{10}(\text{Overall Volume})]*0.20.$$

39. An electrochemical cell as in claim 38, said anode can comprising a structure having a first outer layer corresponding with the outer surface of said electrochemical cell, a second inner layer disposed toward said cavity, and a third layer between said first and second layers, said third layer comprising about 81 percent by weight to about 91 percent by weight of said anode can and comprising stainless steel, said first layer comprising about 2 percent by weight to about 3 percent by weight of said anode can and comprising nickel, and said second layer comprising about 7 percent by weight to about 16 percent by weight of said anode can and comprising copper.

40. An electrochemical cell as in claim 38, anode can having a top, and a first side wall depending downwardly from said top, said first side wall having first inner and outer surfaces, said cathode can having a bottom, and a second side wall extending upwardly from said bottom, said second side wall having second inner and outer surfaces, said seal having a third side wall between said anode can and said cathode can, said third side wall having a thickness between said first outer surface of said first side wall and said second inner surface of said second side wall, the thickness of said third side wall being between about 0.100 millimeter and about 0.150 millimeter.

41. An electrochemical cell as in claim 38, said anode can having a top, and a first side wall depending downwardly from said top, said first side wall having first inner and outer surfaces, said cathode can having a bottom, and a second side wall extending upwardly from said bottom, said second side wall having second inner and outer surfaces, said seal having a third side wall between said anode can and said cathode can, said third side wall having a thickness between said first outer surface of said first side wall and said second inner surface of said second side wall, the thickness of said third side wall being between about 0.110 millimeter and about 0.140 millimeter.

42. An electrochemical cell as in claim 1, said fraction being about equal to the value represented by the equation $$0.69+[\text{Log}_{10}(\text{Overall Volume})]*0.22.$$

43. An electrochemical cell as in claim 42, said anode can and said cathode can having corresponding first and second wall thicknesses between about 0.114 millimeter and about 0.150 millimeter, said seal having a thickness, between said anode can and said cathode can of about 0.100 millimeter to about 0.150 millimeter.

44. An electrochemical cell as in claim 43, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

45. An electrochemical cell as in claim 43, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

46. An electrochemical cell as in claim 42, said anode can comprising a structure having a first outer layer corresponding with the outer surface of said electrochemical cell, a second inner layer disposed toward said cavity, and a third layer between said first and second layers, said third layer comprising about 77 percent by weight to about 91 percent by weight of said anode can and comprising stainless steel, said first and second layers, in combination, comprising about 9 percent by weight to about 23 percent by weight of said anode can, said first layer comprising nickel, and said second layer comprising copper.

47. An electrochemical cell as in claim 42, said anode can comprising a structure having a first outer layer corresponding with the outer surface of said electrochemical cell, a second inner layer disposed toward said cavity, and a third layer between said first and second layers, said third layer comprising about 77 percent by weight to about 91 percent by weight of said anode can and comprising stainless steel, said first and second layers, in combination, comprising about 9 percent by weight to about 23 percent by weight of said anode can, said first layer comprising nickel, and said second layer comprising copper.

48. An electrochemical cell as in claim 42, said anode can comprising a structure having a first outer layer corresponding with the outer surface of said electrochemical cell, a second inner layer disposed toward said cavity, and a third layer between said first and second layers, said third layer comprising about 80 percent by weight to about 91 percent by weight of said anode can and comprising stainless steel, said first and second layers, in combination, comprising about 9 percent by weight to about 20 percent by weight of said anode can, said first layer comprising nickel, and said second layer comprising copper.

49. An electrochemical cell as in claim 42, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

50. An electrochemical cell as in claim 42, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

51. An electrochemical cell as in claim 1, said anode can and said cathode can having corresponding first and second wall thickness between about 0.114 millimeter and about 0.150 millimeter, said seal having a thickness, between said anode can and said cathode can of about 0.100 millimeter to about 0.150 millimeter.

52. An electrochemical cell as in claim 51, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

53. An electrochemical cell as in claim 51, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

54. An electrochemical cell as in claim 1, said anode can comprising a structure having a first outer layer corresponding with the outer surface of said electrochemical cell, a second inner layer disposed toward said cavity, and a third layer between said first and second layers, said third layer comprising about 77 percent by weight to about 91 percent by weight of said anode can and comprising stainless steel, said first and second layers, in combination, comprising about 9 percent by weight to about 23 percent by weight of said anode can, said first layer comprising nickel, and said second layer comprising copper.

55. An electrochemical cell as in claim 1, said anode can comprising a structure having a first outer layer corresponding with the outer surface of said electrochemical cell, a second inner layer disposed toward said cavity, and a third layer between said first and second layers, said third layer comprising about 80 percent by weight to about 91 percent by weight of said anode can and comprising stainless steel, said first and second layers, in combination, comprising about 9 percent by weight to about 20 percent by weight of said anode can, said first layer comprising nickel, and said second layer comprising copper.

56. An electrochemical cell as in claim 1, said anode can comprising a structure having a first outer layer corresponding with the outer surface of said electrochemical cell, a second inner layer disposed toward said cavity, and a third layer between said first and second layers, said third layer comprising about 83 percent by weight to about 91 percent by weight of said anode can and comprising stainless steel, said first and second layers, in combination, comprising about 9 percent by weight to about 17 percent by weight of said anode can, said first layer comprising nickel, and said second layer comprising copper.

57. An electrochemical cell as in claim 1, said anode can comprising a structure having a first outer layer corresponding with the outer surface of said electrochemical cell, a second inner layer disposed toward said cavity, and a third layer between said first and second layers, said third layer comprising about 91 percent by weight of said anode can and comprising stainless steel, said first and second layers, in combination, comprising about 9 percent by weight of said anode can, said first layer comprising nickel, and said second layer comprising copper.

58. An electrochemical cell as in claim 1, said anode can having a top, and a first side wall depending downwardly from said top, said first side wall having first inner and outer surfaces, said cathode can having a bottom, and a second side wall extending upwardly from said bottom, said second side wall having second inner and outer surfaces, said seal having a third side wall between said anode can and said cathode can, said third side wall having a thickness between said first outer surface of said first side wall and said second inner surface of said second side wall, the thickness of said third side wall being between about 0.100 millimeter and about 0.150 millimeter.

59. An electrochemical cell as in claim 1, anode can having a top, and a first side wall depending downwardly from said top, said first side wall having first inner and outer surfaces, said cathode can having a bottom, and a second side wall extending upwardly from said bottom, said second side wall having second inner and outer surfaces, said seal having a third side wall between said anode can and said cathode can, said third side wall having a thickness between said first outer surface of said first side wall and said second inner surface of said second side wall, the thickness of said third side wall being between about 0.110 millimeter and about 0.140 millimeter.

60. An electrochemical cell, comprising:
    (a) an anode, including (i) an anode can and (ii) a cavity in said anode can, and anode material in said cavity, including electrochemically reactive anode material; and
    (b) a cathode, including a cathode can, and a cathode assembly in said cathode can,
said anode can and said cathode can being joined together, with a seal therebetween and, in combination, defining a top and a bottom of said cell with a height therebetween, and side walls defining a maximum diameter of said electrochemical cell, said height and said maximum diameter, in combination, defining an overall volume of said electrochemical cell, said overall volume being between about 0.50 cm$^3$ and about 0.60 cm$^3$, said cavity in said anode can comprising a fraction of said overall volume, said fraction being at least 0.59.

61. An electrochemical cell as in claim 60, said fraction being between about 0.59 and about 0.71.

62. An electrochemical cell as in claim 60, said fraction being between about 0.60 and about 0.68.

63. An electrochemical cell as in claim 60, said fraction being between about 0.61 and about 0.66.

64. An electrochemical cell as in claim 60, said fraction being between about 0.62 and about 0.64.

65. An electrochemical cell as in claim 60, said fraction being about 0.63.

66. An electrochemical cell as in claim 60, said fraction being between the value represented by the equation 0.65+Log (Overall Volume)*0.20 and about the value 0.71.

67. An electrochemical cell as in claim 60, said fraction being between the value represented by the equation 0.65+[Log$_{10}$(Overall Volume)]*0.20 and about the value 0.68.

68. An electrochemical cell as in claim 60, said fraction being between the value represented by the equation 0.65+[Log$_{10}$(Overall Volume)]*0.20 and the value 0.66.

69. An electrochemical cell as in claim 60, said fraction being between the value represented by the equation 0.65+[Log$_{10}$(Overall Volume)]*0.20 and the value 0.64.

70. An electrochemical cell as in claim 60, said fraction being between the value represented by the equation 0.65+[Log$_{10}$(Overall Volume)]*0.20 and about the value 0.63.

71. An electrochemical cell, comprising:
   (a) an anode, including (i) an anode can and (ii) a cavity in said anode can, and anode material in said cavity, including electrochemically reactive anode material; and
   (b) a cathode, including a cathode can, and a cathode assembly in said cathode can, said anode can and said cathode can being joined together, with a seal therebetween and, in combination, defining a top and a bottom of said cell with a height therebetween, and side walls defining a maximum diameter of said electrochemical cell, said height and said maximum diameter, in combination, defining an overall volume of said electrochemical cell, said overall volume being between about 0.20 cm$^3$ and about 0.30 cm$^3$, said cavity in said anode can comprising a fraction of said overall volume, said fraction being at least 0.53.

72. An electrochemical cell as in claim 71, said fraction being between about 0.53 and about 0.64.

73. An electrochemical cell as in claim 71, said fraction being between about 0.53 and about 0.60.

74. An electrochemical cell as in claim 71, said fraction being between about 0.53 and about 0.58.

75. An electrochemical cell as in claim 71, said fraction being between about 0.53 and about 0.56.

76. An electrochemical cell as in claim 71, said fraction being about 0.54.

77. An electrochemical cell as in claim 71, said fraction being between the value represented by the equation 0.65+[Log$_{10}$(Overall Volume)]*0.20 and about the value 0.64.

78. An electrochemical cell as in claim 71, said fraction being between the value represented by the equation 0.65+[Log$_{10}$(Overall Volume)]*0.20 and about the value 0.60.

79. An electrochemical cell as in claim 71, said fraction being between the value represented by the equation 0.65+[Log$_{10}$(Overall Volume)]*0.20 and about the value 0.58.

80. An electrochemical cell as in claim 71, said fraction being between the value represented by the equation 0.65+[Log$_{10}$(Overall Volume)]*0.20 and about the value 0.56.

81. An electrochemical cell as in claim 71, said fraction being between the value represented by the equation 0.65+[Log$_{10}$(Overall Volume)]*0.20 and about the value 0.54.

82. An electrochemical cell, comprising:
   (a) an anode, including (i) an anode can and (ii) a cavity in said anode can, and anode material in said cavity, including electrochemically reactive anode material; and
   (b) a cathode, including a cathode can, and a cathode assembly in said cathode can, said anode can and said cathode can being joined together, with a seal therebetween and, in combination, defining a top and a bottom of said cell with a height therebetween, and side walls defining a maximum diameter of said electrochemical cell, said height and said maximum diameter, in combination, defining an overall volume of said electrochemical cell, said overall volume being between about 0.12 cm$^3$ and about 0.20 cm$^3$, said cavity in said anode can comprising a fraction of said overall volume, said fraction being at least as great as 0.46.

83. An electrochemical cell as in claim 82, said fraction being between about 0.46 and about 0.55.

84. An electrochemical cell as in claim 82, said fraction being between about 0.47 and about 0.53.

85. An electrochemical cell as in claim 82, said fraction being between about 0.48 and about 0.51.

86. An electrochemical cell as in claim 82, said fraction being about 0.49.

87. An electrochemical cell as in claim 82, said fraction being between the value represented by the equation 0.65+[Log$_{10}$(Overall Volume)]*0.20 and about the value 0.55.

88. An electrochemical cell as in claim 82, said fraction being between the value represented by the equation 0.69+[Log$_{10}$(Overall Volume)]*0.22 and about the value 0.53.

89. An electrochemical cell, comprising:
   (a) an anode, including (i) an anode can and (ii) a cavity in said anode can, and anode material in said cavity, including electrochemically reactive anode material; and
   (b) a cathode, including a cathode can, and a cathode assembly in said cathode can, said anode can and said cathode can being joined together, with a seal therebetween and, in combination, defining a top and a bottom of said cell with a height therebetween, and side walls defining a maximum diameter of said electrochemical cell, said height and said maximum diameter, in combination, defining an overall volume of said electrochemical cell, said overall volume being between about 0.06 cm$^3$ and about 0.12 cm$^3$, said cavity in said anode can comprising a fraction of said overall volume, said fraction being at least 0.43.

90. An electrochemical cell as in claim 89, said fraction being between about 0.43 and about 0.56.

91. An electrochemical cell as in claim 89, said fraction being between about 0.44 and about 0.54.

92. An electrochemical cell as in claim 89, said fraction being between about 0.46 and about 0.52.

93. An electrochemical cell as in claim 89, said fraction being between about 0.47 and about 0.50.

94. An electrochemical cell as in claim 89, said fraction being about 0.48.

95. An electrochemical cell as in claim 89, said fraction being between the value represented by the equation $$0.65 + [\text{Log}_{10}(\text{Overall Volume})] * 0.20$$

and about the value 0.56.

96. An electrochemical cell as in claim 89, said fraction being between the value represented by the equation $$0.65 + [\text{Log}_{10}(\text{Overall Volume})] * 0.20$$

and about the value 0.54.

97. An electrochemical cell as in claim 89, said fraction being between the value represented by the equation $$0.65 + [\text{Log}_{10}(\text{Overall Volume})] * 0.20$$

and about the value 0.50.

98. An electrochemical cell as in claim 89, said fraction being between the value represented by the equation $$0.69 + [\text{Log}_{10}(\text{Overall Volume})] * 0.22$$

and about the value 0.49.

99. An electrochemical cell, comprising:
    (a) an anode, including (i) an anode can and (ii) a cavity in said anode can, and anode material in said cavity, including electrochemically reactive anode material said anode can having a top, and a first side wall depending downwardly from said top, said first side wall having first inner and outer surfaces;
    (b) a cathode, including a cathode can, and a cathode assembly in said cathode can, said cathode can having a bottom, and a second side wall extending upwardly from said bottom, said second side wall having second inner and outer surfaces; and
    (c) a resiliently deformable seal extending about a circumference of said electrochemical cell, said resiliently deformable seal having a third side wall having a thickness between said first outer surface of said first side wall and said second inner surface of said second side wall, the thickness of said third side wall being between about 0.100 millimeter and 0.150 millimeter.

100. An electrochemical cell as in claim 99, the thickness of said third side wall being between about 0.110 millimeter and about 0.140 millimeter.

101. An electrochemical cell as in claim 99, the thickness of said third side wall being between about 0.110 millimeter and about 0.127 millimeter.

102. An electrochemical cell as in claim 99, said anode and said cathode, in combination, defining a top and a bottom of said cell with a height therebetween, and side walls defining a maximum diameter of said electrochemical cell, said height and said maximum diameter, in combination, defining an overall volume of said electrochemical cell, said cavity in said anode can comprising a fraction of said overall volume, said fraction being at least as great as the value represented by the equation $$0.65 + [\text{Log}_{10}(\text{Overall Volume})] * 0.20.$$

103. An electrochemical cell as in claim 99, said anode and said cathode, in combination, defining a top and a bottom of said cell with a height therebetween, and side walls defining a maximum diameter of said electrochemical cell, said height and said maximum diameter, in combination, defining an overall volume of said electrochemical cell, said cavity in said anode can comprising a fraction of said overall volume, said fraction being at least as great as the value represented by the equation $$0.69 + [\text{Log}_{10}(\text{Overall Volume})] * 0.20,$$

up to the value represented by the equation $$0.77 + [\text{Log}_{10}(\text{Overall Volume})] * 0.20.$$

* * * * *

UNITED STATES PATENT AND TRADEMARK OFFICE
CERTIFICATE OF CORRECTION

PATENT NO. : 5,582,930
DATED : December 10, 1996
INVENTOR(S) : John Edward Oltman et al.

It is certified that error appears in the above-identified patent and that said Letters Patent is hereby corrected as shown below:

Column 18, line 40, change "is-transmitted" to --is transmitted--.

In the Claims
Claim 1, line 17, change "0.65+Log$^{10}$(Overall Volume)*0.20," to --0.65+[Log$_{10}$(Overall Volume)]*0.20--.
Claim 6, line 1, change "Am" to --An--; line 5, change the second occurrence of "layer" to --layers--.
Claim 15, line 2, change "outerlayer" to --outer layer--.
Claim 21, line 4, after "0.150" insert --millimeter, said seal having a thickness, between said anode can--.
Claim 36, line 1, insert --said-- before "anode".
Claim 37, line 1, insert --said-- before "anode".
Claim 40, line 1, insert --said-- before "anode".
Claim 59, line 1, insert --said-- before "anode".
Claim 66, line 3, change "0.65+Log (Overall Volume)*0.20" to --0.65+[Log$_{10}$(Overall Volume)]*0.20--.

Signed and Sealed this

Seventeenth Day of October, 2000

Attest:

Q. TODD DICKINSON

*Attesting Officer*      *Director of Patents and Trademarks*